US006892204B2

(12) United States Patent
Haas et al.

(10) Patent No.: US 6,892,204 B2
(45) Date of Patent: May 10, 2005

(54) SPATIALLY INTEGRATED RELATIONAL DATABASE MODEL WITH DYNAMIC SEGMENTATION (SIR-DBMS)

(75) Inventors: Robert P. Haas, Knoxville, TN (US); Stephen H. Robertson, Knoxville, TN (US)

(73) Assignee: Science Applications International Corporation, San Diego, CA (US)

( * ) Notice: Subject to any disclaimer, the term of this patent is extended or adjusted under 35 U.S.C. 154(b) by 368 days.

(21) Appl. No.: 09/834,637

(22) Filed: Apr. 16, 2001

(65) Prior Publication Data

US 2002/0174124 A1 Nov. 21, 2002

(51) Int. Cl.[7] .............................................. G06F 17/00
(52) U.S. Cl. ............................ 707/100; 701/208; 707/1
(58) Field of Search .................... 707/1–10, 100–104.1, 707/200–206; 701/208–212

(56) References Cited

PUBLICATIONS

Landis, Kate, "Integrating Dynamic Segmentation into Publication Quality Transportation Maps," 1996 Environmental Systems Research Institute, Inc. International User Conference Proceedings, May 20–24, 1996.

"ArcInfo 8, A New GIS for the New Millennium," Environmental Systems Research Institute, Inc., 1999.

"ArcView GIS," Environmental Systems Research Institute, Inc., 2000.

Environmental Systems Research Institute, Inc., webpage updated Mar. 12, 2001, original publication date unknown.

*Primary Examiner*—Jean M. Corrielus
*Assistant Examiner*—Joon Hwan Hwang
(74) *Attorney, Agent, or Firm*—Kilpatrick Stockton LLP

(57) ABSTRACT

A method and system for providing an open database model that allows the combining of spatial and Attribute data in a single relational database. The integration of spatial and Attribute data allows the data to be accessed by either standard structured query language (SQL) or a GIS viewing application. The invention provides: enhanced performance by avoiding proliferation of segmentation; open dynamic segmentation; integrated temporal data; and automated database maintenance. Permanent anchor sections are provided to define spatial references. The data model allows for intersections in the interior of a link (anchor section), resulting in a more stable form of a link, or anchor section. The use of anchor sections simplifies maintenance of data associated with the anchor sections and facilitates the use of anchor sections in a distributed environment. Database views display data in a simple, tabular format. Access to a continuous archive of historical data is supported.

21 Claims, 20 Drawing Sheets

SPATIALLY INTEGRATED RELATIONAL DATABASE MODEL WITH DYNAMIC SEGMENTATION (SIR-DBMS)

BACKGROUND OF THE INVENTION

1. Field of the Invention

The present invention relates to database management systems and their use with transportation information systems and spatial geographic information, and more particularly to a spatially integrated relational database using dynamic segmentation for associating linear and spatial information and a method for using the database system with spatial data methods.

2. Description of the Related Art

Commercial relational database management systems have recently provided the ability to store spatial data, but do not support full dynamic segmentation. Commercial graphical information systems (GIS) have provided the ability to store both spatial and relational data, but only in proprietary formats. An anchor section is an underlying spatial referencing mechanism for linear data. In terms of a road network, an anchor section represents a physical section of a roadway, typically a section that connects two intersections.

Commercial GISs do not maintain permanent anchor sections. Currently, GISs break existing anchor sections when a new intersection is identified along an existing anchor section. This proliferates the number of anchor sections, and consequently the size of the database, and also reduces database performance due to this segmentation of anchor sections.

GIS applications have traditionally used a link-node network to represent road networks, where a link represents a section of road. A node, which occurs at the ends of the link, represents either an intersection between links or the end of a road. Because nodes (i.e., intersections) can only occur at the ends of a link, most changes to a road network require splitting of existing links. For example, adding a new intersection in the middle of an existing link requires that the link be split at the intersection point to form two links. Splitting a link has serious adverse consequences. Any references to the original link (e.g., the assignment of a pavement type to a portion of the link) become invalid. In the case of a single data repository, complex data maintenance activities can automatically correct for these changes. However, in a distributed data environment, an automated correction methodology is not feasible.

Many GIS applications use proprietary implementations of dynamic segmentation to associate data values with locations in a roadway. A disadvantage of using such proprietary solutions is that the data within the GIS application is inaccessible to other applications, limiting access to the data by non-GIS users, and making the data more difficult to integrate with other non-GIS data.

Many applications provide access to historical data through periodic snapshots that are stored off-line, thus limiting access to historical data and making it more difficult to perform analyses that integrate historical and current data.

In 1994, the Georgia Department of Transportation (GDOT) initiated a strategic planning process that identified improvements necessary to achieve a greatly improved transportation program. As a result of this strategic planning effort GDOT worked with Georgia Institute of Technology (GTECH) to prepare "A Strategic Plan for Developing a Comprehensive GDOT Transportation Information System (TIS)", also called the "Plan", and herein incorporated by reference in its entirety. The Plan examined technologies and processes used for information protocols, data collection, data formats and standards, and communications in the department. The Plan recommended implementation of a transportation information system (TIS) to upgrade data integration, utility and quality of information applications and resources.

GDOT's intention is to share the products of information technology (IT) efforts with other state agencies and the private sector. The state of Georgia is actively developing statewide IT programs that will result in better service delivery and more efficient government. Georgia's IT programs will employ GIS maps developed by GDOT. The maps are also available to the private sector. Two initial systems to be developed were the Transportation Systems and Facilities (TSAF) system and the Transportation Projects subsystem (TPro), the functional specifications of which are in the aforementioned Plan. These two (2) systems combine to create a TIS core module (CM). It is within this context that that an embodiment of the present invention is described.

The Transportation Systems and Facilities (TSAF) system, part of the Transportation Information System (TIS) for the Georgia Department of Transportation (GDOT), is a system designed to provide enterprise-wide access to a large collection of both spatial and tabular GDOT data. TSAF is designed as a relational database and implemented in an Oracle® database which houses the TSAF data, maintenance routines for maintaining this data, and data service routines that provide access to this data over the GDOT intranet through a Web browser. While this configuration is typical for enterprise-wide database systems, TSAF must meet a number of other requirements that differentiate TSAF from most other enterprise-wide database systems.

The GDOT TIS is designed to be a single repository for road network data. TIS will include data for the TSAF and for TPro. The capability to store and retrieve both relational and spatial data must include both GDOT roadways and multi-modal assets. A multi-modal asset is a facility that is related to both a road network and another transportation system (e.g., a park and ride facility). In the example, a park and ride location is related to riding on the road, but does not relate to the road itself. Typically, an multi-modal asset is a transition point between two different transportation systems. A major consideration for the data relating assets with linear attributes such as roadways, railways and transit systems is having a flexible and robust linear referencing system (LRS). Currently GDOT employs more than one linear referencing method (LRM), and in the future may use global positioning system (GPS) coordinates as a location referencing method.

While recognized as desirable, no one to date has implemented an open system for storing and retrieving relational and spatial data in a single repository of road network data. The systems available today do not relate linear, spatial and temporal data in an open system available to third party applications.

BRIEF SUMMARY OF THE INVENTION

It is therefore provided herein a method and system for providing an open database model that allows the combining of spatial and linear attribute data in a single relational database. The integration of spatial and attribute data allows the data to be accessed by either standard structured query language (SQL) or a GIS application.

The present invention also provides: enhanced performance by avoiding proliferation of anchor section, or link, segmentation; open dynamic segmentation; integrated temporal data, allowing reporting of historical data; and automated database maintenance to provide consistency among related databases.

According to an embodiment of the invention, permanent anchor sections are provided to define spatial references. The data model allows for intersections in the interior of a link (anchor section), resulting in a more stable form of a link, or anchor section. The use of anchor sections simplifies maintenance of data associated with the anchor sections and facilitates the use of anchor sections in a distributed environment.

An embodiment of the present invention implements dynamic segmentation using open data structure built into a commercial-off-the-shelf relational database, e.g. Oracle8i™ or Oracle9i™ available from Oracle Corporation, which allows access to the data by any user who can access the Oracle® database (Oracle8i™, Oracle9i™, and Oracle® and are trademarks of Oracle Corporation). Other types of commercial database systems could be used such as those available from Sybase Corporation of Emeryville, Calif. (Sybase®) or from Computer Associates, Inc. of Islandia, N.Y. (Ingres II). SQL statements that implement a dynamic segmentation query can be very complex. Therefore, the present invention provides database views that display data in a simple, tabular view that is easier to use and provides an SQL generator that can generate the appropriate SQL statement for a dynamic segmentation query.

In a further embodiment of the invention, seamless access to a continuous archive of historical data is supported. The historical data is stored in the same format as the current data, but flagged with a time code and status code, indicating that it is old data.

One complication of an integrated spatial and relational database is maintaining synchronized spatial and relational data. For example, several different maps may be derived from the pavement type (e.g., a map of paved roads, a map of unpaved state routes), and each such map must be modified whenever the pavement type for a section of road changes. Also, the city in which a section of road lies is stored as a relational value (so that this value can be used in relational queries), but it is derived from a spatial representation of the city boundary, and the relational values should be updated if the city boundary value changes. In accordance with the system and method, spatial and relational data are automatically synchronized to overcome this problem.

BRIEF DESCRIPTION OF THE DRAWINGS

The accompanying drawings, which are incorporated in and form part of the specification, illustrate the present invention, when viewed with reference to the description, wherein.

DETAILED DESCRIPTION OF THE INVENTION

Figure 1:
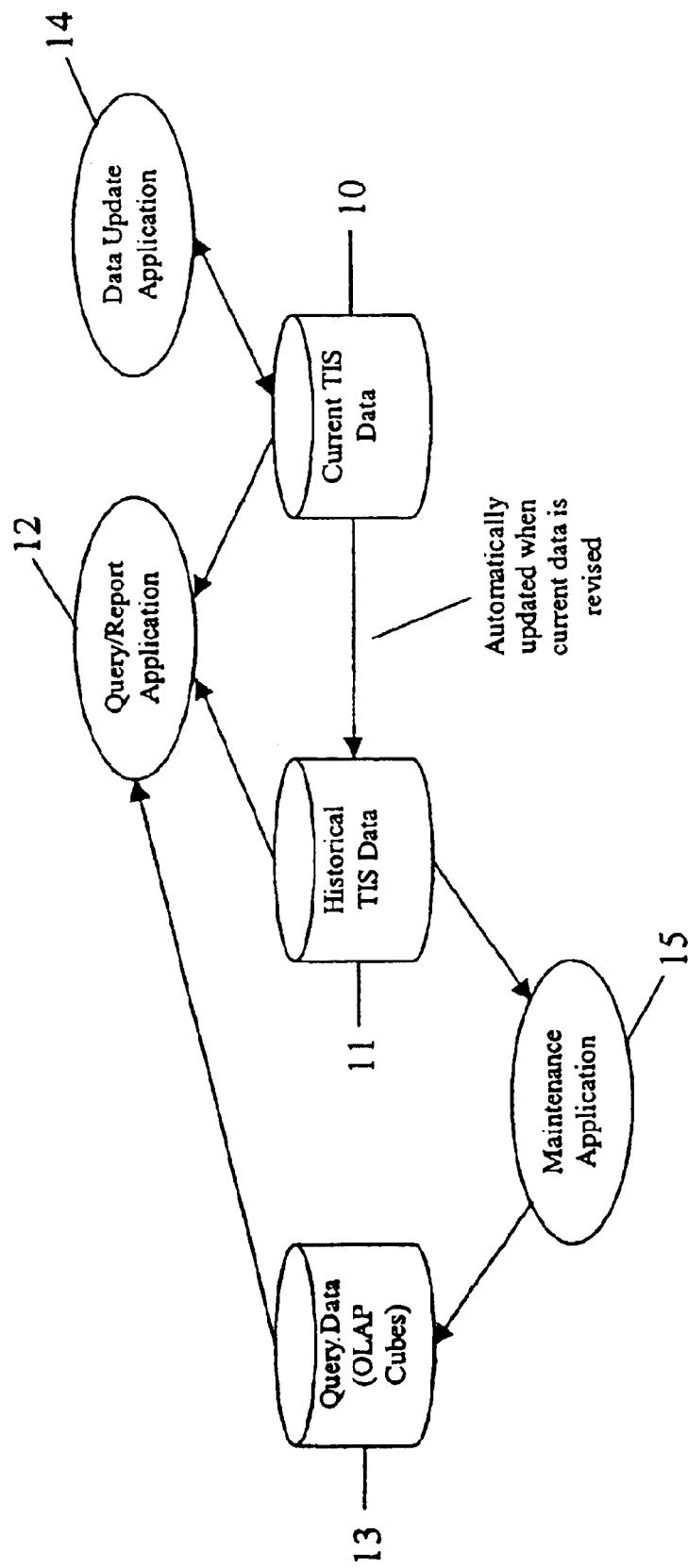
FIG. 1 is a block diagram of the structure of a core module data archive for a transportation information system.

The present invention is a method and system for providing an open database model that allows the combining of spatial and linear attribute data in a single relational database. The integration of spatial and attribute data allows the data to be accessed by either standard structured query language (SQL) or a GIS viewing application.

As an exemplary embodiment of the invention, the system and method are herein described in the context of an implementation of a transportation information system (TIS) that meets the afore-mentioned requirements of the Georgia Department of Transportation (GDOT). As such, the system and method described herein will be discussed in the context of an implementation of a core module of the GDOT TIS, specifically a transportation systems and facilities (TSAF) system. It will be apparent to one of ordinary skill in the art how to modify the system and method for integration with other GIS and transportation systems.

For purposes of the understanding the description herein, a number of terms in the industry are defined below or described with respect to the requirements of the system and method as described herein:

Road network data. Road network data is data that defines the road to the extent that the information can be queried based on a set of desired road characteristics. Attributes of the road network (i.e., road characteristic data such as pavement type, number of lanes, location in the network) and events that occur along the road network (e.g., accidents, potholes, flooded roadways) are stored as part of the road network. A Road-Division Data Model (as defined hereafter) is a model that defines the road network and supports associating attributes and events with positions in the road network. This data can be queried to generate reports and rendered to generate maps.

Spatial data. Spatial data is data tied to a position in the road network (e.g., road characteristics) or tied to a coordinate location (e.g., wetlands, airports). In the exemplary embodiment, most of the data in the TIS is spatial. The system and method described herein accommodates both types of spatial data. Some interchange between these two types of spatial data is also supported by generating road characteristic values from polygonal boundary data (e.g., assigning a county attribute to the road based on the polygonal boundaries for the counties). The spatial data can be queried to generate reports and rendered to generate maps.

Relational data access. Relational data access refers to data that is accessible through traditional relational database tools and is presented to a user in a tabular display. Although most data in the exemplary embodiment is spatial in nature, most users are accustomed to accessing road network data through relational database tools. Thus, the system and method includes software that presents data as tabular query results and reports. Standard relational database tools (e.g., Microsoft® Access database) can also be used to access the TIS data.

GIS access. GIS access refers to the ability to access geographic information system data in the manner traditional to GIS systems (i.e., producing maps). One of the powers of the data model of the present invention is the ability to produce maps that describe and relate the data. Software that presents a number of standard maps of the data is provided in the system and method. Standard GIS tools (e.g., ArcView available from ESRI, Inc.) can also be used to access the TIS data using an open architecture.

Historical data. Historical data is data that is identified by a time when it was valid data, but may no longer be valid at the current time. It is desirous to maintain a historical record of data in a TIS. The present invention is designed to maintain a historical record of data by time stamping database records with a birth and end (or expiration) date. In this way, data can be queried as it existed at any specified time, and time-series analysis of the data can be performed.

Extensibility. Extensibility of a system or data model allows the system or model to be extended easily with additional entities or attributes or types of data. This is usually due to a framework that is previously designed and easily extended without it being necessary rewrite computer code. Existing TIS and TSAF systems currently maintain a large number of segregated and independent databases. When the system and method are initially implemented for a specific system, many of these independent databases may either be incorporated into the system, or will be replicated in the system for enterprise-wide access. However, it is expected that users of the system will want to extend it to incorporate additional data in the future. The present invention includes a Data Dictionary that contains meta-data about the data elements in the system and thus can be extended to incorporate additional data elements with minimal modifications to the software.

Accountability. Accountability means that changes to data or infrastructure can be tracked, thus making the user who modifies the data accountable for the changes. In the context of the exemplary embodiment, GDOT requires a level of accountability. Some of the data is critical to operations, and it is important to monitor the changes to that data. Thus, the system maintains a record of data maintenance activities and the data affected by those activities.

Locking. Locking is locking of data so that it cannot be modified for the period of time in which it is locked. Some implementations of the system and method may require that certain data be held static for an extended period of time while data collection processes collect new data. Therefore, the system and method supports locking, also known as data locking, of both the geographical definition and attributes for specified sections of road and for other system Entities.

Anchor LRM. An Anchor LRM is the core linear referencing method used to store the data defining the location for any object whose location is associated with the road network. The Anchor LRM comprises a collection of Anchor Sections and a linear measure along each Anchor Section. A location is identified by the identifier (ID) of the associated Anchor Section and the start and end offsets for the location on that Anchor Section or, if the location spans several Anchor Sections, by a collection of such information. In other words, a location is specified in terms of a dynamic segmentation of the Anchor Sections.

Anchor Section. An Anchor Section is the core linear feature used as the basis for the Anchor LRM. In the context of the exemplary embodiment, an Anchor Section represents a physical section of a roadway, typically a section that connects two intersections. In other geographic information systems, the equivalent element would be called a "link" or a like equivalent term. Anchor Sections refers to the definition herein and equivalents in other systems.

Division Section. A Division Section typically refers to an Anchor Section or road section and is a representation of a physical, linear section of a division of a roadway. For instance, a road may have more than one lane, or contain a median or a shoulder (i.e., multiple divisions). The lanes, median and shoulder all travel parallel and serve to make up the entire road section, however, they may have different attributes (e.g. pavement type), and it is convenient to be able to access information on multiple divisions of the same length of road.

Traversal. A Traversal represents a road or a collection of road divisions.

Intersect. An Intersect represents an intersection between roads.

Lanes. Lanes represent individual lanes in a roadway.

Milepost. A Milepost provides a second linear referencing method along some Traversals.

The system and method described herein provide a solution to the requirement to establish a TIS network data model that will incorporate a robust and flexible linear referencing system (LRS). The core of the TIS network data model is a road network based linear referencing method (LRM), the Anchor LRM, that provides a unique location reference that is used across all TIS applications. Road attribute data is stored by associating each attribute with locations specified in terms of this LRM. Attributes of a road (road attribute data) include things such as pavement type, whether or not there is a median and its type, number of lanes, street name, etc. Project locations are specified in terms of the Anchor LRM. Most spatial queries are performed by first determining the portions of the Anchor LRM contained in a spatial area, then reporting on the attributes of these Anchor LRM "sections." Conversion tables enable TIS software to interpret a location expressed in terms of an existing reference systems (e.g., GDOT currently uses RCLink and milepoint as reference systems). In the context of the GDOT TIS, RCLink numbers are used to reference locations. An RCLink number is a unique ten digit code used to tag city, county and state maintained roads. This RCLink number links the arcs in the database to GDOT's RCFile (road network database), which holds the related road data. A route system was then built on top of the arcs, based on the RCLink number. Spatial data is stored for each LRM section, enabling TIS to integrate GIS maps (i.e., in displays and reports) with other TIS functions. Intermodal, or multi-modal, relationships are supported both (a) by associating an intermodal point to a position in the LRM and (b) through different layers displayed in GIS-enabled applications.

Referring now to the drawings, and in particular to FIG. 1, the general structure of the core module data archive for the exemplary TIS is shown. The core module (CM) maintains not only the current version of all TIS data 10, but also maintains a historical data archive 11 that can (a) produce reports using a query/report application 12 that compare historical and current data (e.g., traffic counts by calendar year) and (b) reproduce historical reports. Moreover, certain historical data will also be migrated to a database 13, the query database, that is optimized for historical queries.

The current TIS database 10 contains the current version of any data, both spatial and relational, maintained within TIS. Associated with each data item in the current TIS data is a birth date column that specifies when this data item first became applicable. Much of the user interaction with the TIS data will be through the current TIS database 10, though the TIS software will automatically route any data queries that require historical information to historical TIS database 11.

The historical TIS database 11 contains archived versions of all TIS data, both spatial and relational. The structure of the historical TIS data is identical to that of data in the current TIS database 10, except that a death date (as well as the aforementioned birth date) is associated with each data item. A data update application 14 maintains the TIS data. Changes are written to the current TIS database 10, which triggers an update to the historical TIS database 11 (i.e., assign a death (end) date to the previous current value stored in the historical TIS database and insert the new current value). A query/report application 12 will typically draw on either the current or historical TIS database, as appropriate, to respond to user requests. Because essentially the same data structure is used for each of these data sets, the same software interface can easily access both data sets. When necessary to improve performance of historical queries, the query/report application 12 will use the optimized query database 13 for certain queries and reports.

The query database 13 contains copies of some historical data in a format that is optimized to improve performance of historical queries. A maintenance application 15 will periodically update the query database 13 with the most recent historical data, and the query/report application 12 will direct some queries to the query database 13.

Figure 2:
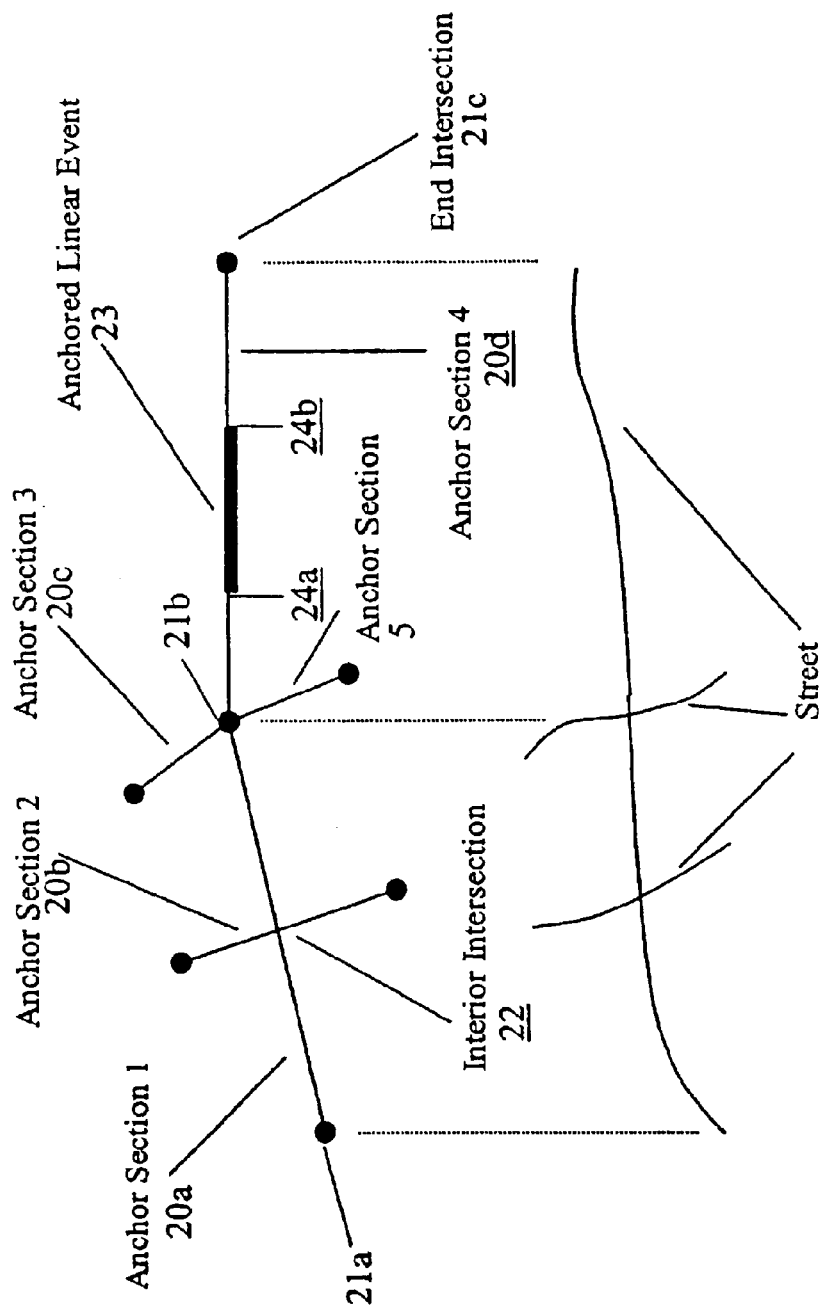
FIG. 2 is an illustration describing an anchor linear referencing method (LRM)

Referring now to FIG. 2, there is shown the Anchor linear referencing method (Anchor LRM). The Anchor LRM is defined as a collection of Anchor Sections and intersections that represent the roadways that are part of the TIS data. An Anchor Section 20a–d represents a linear portion of a street, and serves, along with the length measure along the Anchor Section, as the basis for the Anchor LRM. Typically, an Anchor Section 20a–d will represent the portion of a roadway that connects two adjacent intersections, the end intersections 21 of the Anchor Section. For instance, Anchor Section 20d has end intersections 21b and 21c. However, as a road network evolves and new cross-streets are added, interior intersections 22 will be added to the road network and, because of these interior intersections, the Anchor Sections will be topologically more complicated.

An Anchored linear event 23 is a linear portion of an Anchor Section 20, and is specified by a numeric identifier (ID) that identifies the Anchor Section. In this case, anchor section 20d, and a start 24a and end 24b offset along the Anchor Section specify the ends of the Anchored linear event. In the TIS network data model, these values are stored as integers that represent the offset in units. For example, units of 0.01% of the entire length of the Anchor Section (i.e., a value of 0 indicates the start of the Anchor Section and a value of 10000 indicates the end) are used in the exemplary embodiment. Other units may be used, as will be readily apparent to those of ordinary skill in the art. Anchored linear events are the basis for all linear references using the Anchor LRM: the location of a point event is specified as an Anchored linear event with the same start and end offset, the location of a small linear event is specified as an Anchored linear event, and the location of any other event is specified as a collection of Anchored linear events.

More detailed road network data, if required, is identified by associating additional attributes to the Anchor Section and Anchored linear event data: a "Divided Roadway Flag" indicates whether an Anchor Section is a divided roadway; a "Division Value" indicates the division(s) of an Anchor Section to which a value applies; a "Lane Count Value" indicates that number of lanes that comprise an Anchor Section; a Lane Value" indicates the lane(s) to which a value applies; and if necessary, any of the flags and values listed above can be implemented as a segmented value, if it is important to identify that the value applies to only portions of an Anchor Section.

Figure 3:
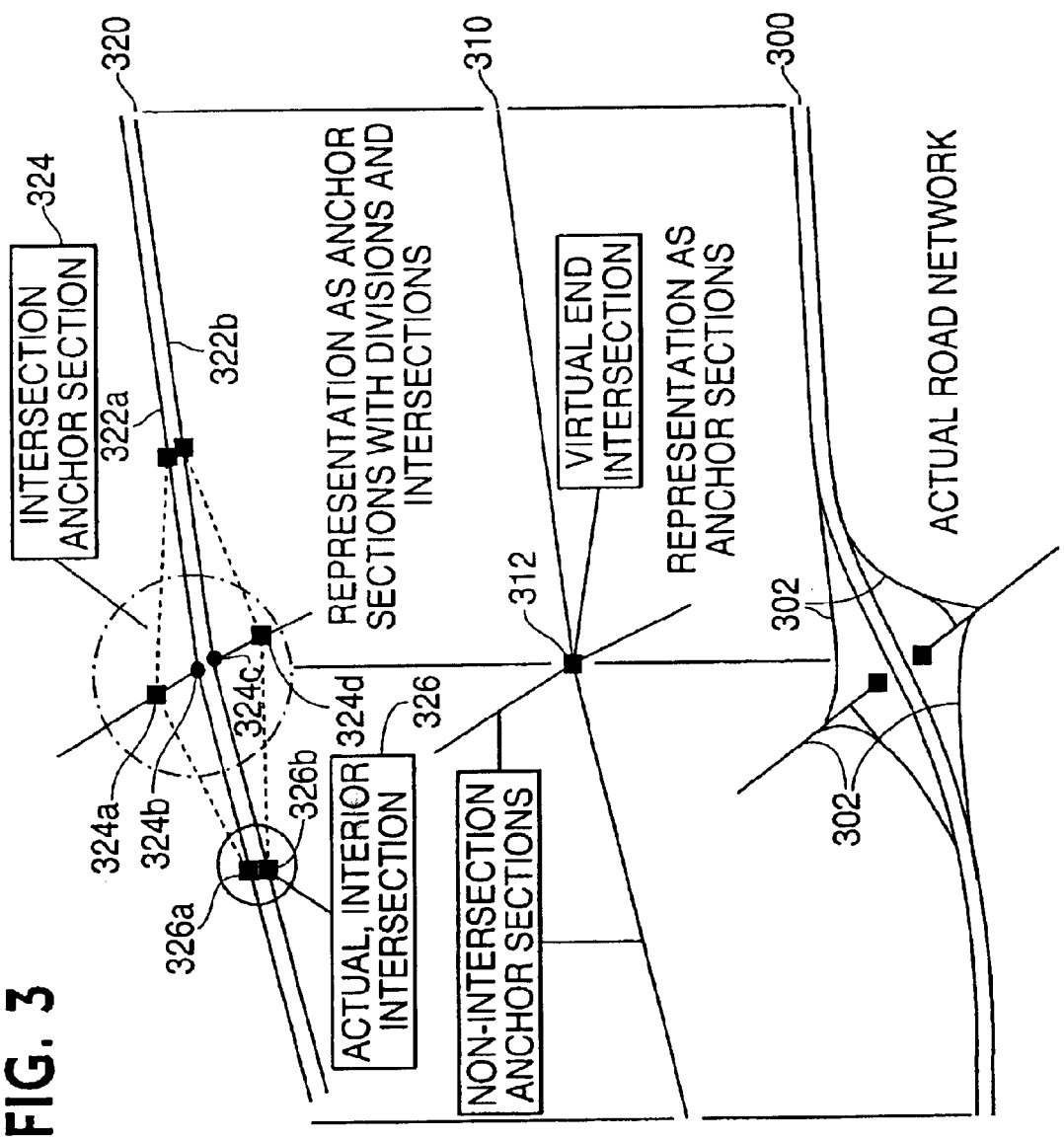
FIG. 3 depicts the detail layers of a transportation information system network road data model.

FIG. 3 is exemplary of a portion of a road network. The Anchor Section table contains data representing the sections of roadway in the TIS Network Data Model. While this data is sufficient to store and retrieve road characteristic and other event data associated with the roadway, it is not sufficient to model navigation features of the roadway. To complete the model, the Anchor Section data is supplemented with the Intersection table that contains information about the road intersections. Referring now to FIG. 3, an actual road network 300 is represented by both an Anchor Section 310 and Anchor Sections with Divisions and intersections 320. For instance, the Anchor Section representation 310 merely shows the road generally, as one Entity, with a virtual end intersection 312, representing the on/off ramps 302 of the actual roadway. The Anchor Section with Divisions and intersection representation shows multiple lanes 322a and 322b, in addition to a more complex intersection 324 which identified various points within the intersection 324a–d. Moreover, an interior intersection 326 (i.e., not located at the end of the Anchor Section) is represented. One should note that the interior intersection 326a–b is represented for each road Division 322a–b.

Figure 4:
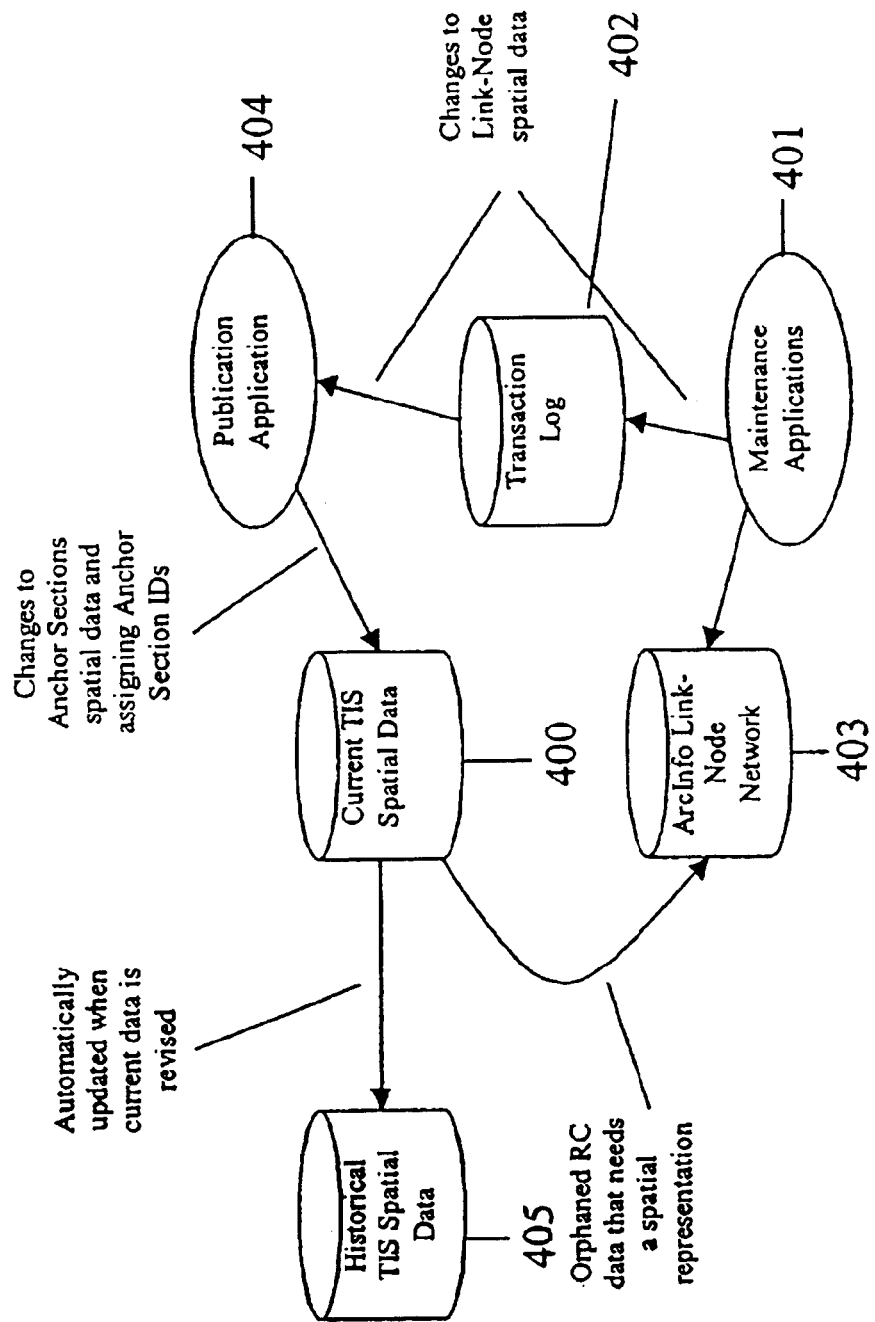
FIG. 4 is a block diagram depicting maintenance of an anchor linear referencing method.

The maintenance process is depicted in FIG. 4. Because of the considerable investment in current GIS tools for maintaining the existing road network data, modifications of existing off-the-shelf tools are used for maintaining the Anchor LRM. This approach also alleviates any difficulties that may arise during the transition from the current methods to those in TIS; maintaining existing ArcInfo (available from ESRI, Inc.) road network data allows the production of many of the reports required by existing users using either the new TIS methods or the existing ones.

The exemplary embodiment of the invention is integrated with commercial off-the-shelf desktop mapping and GIS software, e.g., ArcView GIS, ArcInfo and other software available from ESRI, Inc. These state of the art systems use link-node networks to represent roads. The present invention maintains compatibility with this scheme, while utilizing permanent Anchor Sections.

Referring now to FIG. 4, there is shown a block diagram depicting the maintenance of Anchor LRMs. This maintenance process requires three primary modifications from the existing methods: (1) the existing ArcInfo tables 400 include the Anchor Section ID associated with each ArcInfo Link, (2) the existing maintenance application generates a transaction log 402 identifying changes to the ArcInfo Link-Node network 403, and (3) a new publication application 404 uses this transaction log 402 to update the TIS Anchor Section data 400 and propagate changes to the historical TIS Database 405, as necessary. In one embodiment, software tools (1) inform the user of "orphaned" road characteristic (RC) data (e.g., RC data that is gathered before the line work for that road is generated) to help manage the Anchor LRM maintenance process and (2) identify Anchor Sections without RC data so that the appropriate RC data can be gathered and entered.

Figure 5:
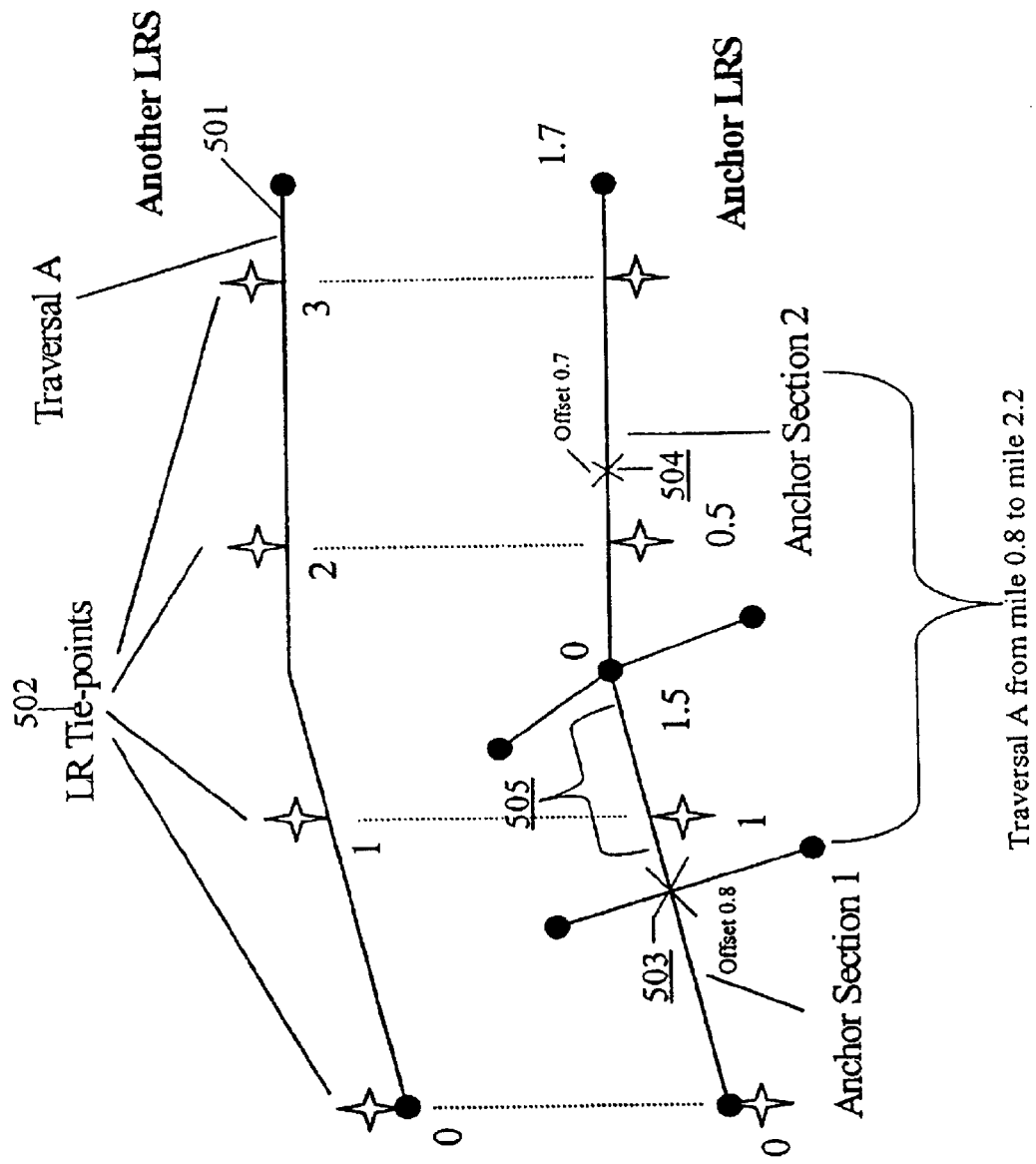
FIG. 5 depicts other linear referencing methods.

The Anchor LRM provides a uniform linear referencing method that can be used for all TIS data. However, many existing applications use other LRM's (e.g., RCLink, county-route-milepost). Therefore, a method for data translation is implemented. FIG. 5 shows the method used to support translation between other LRM's and the Anchor LRM. For example, the system automatically converts between an RCLink linear reference and a linear reference based on the Anchor LRM.

Referring now to FIG. 5, a TIS LRM (other than the Anchor LRM) is defined by (a) a collection of traversals 501, which are a linear sequence of Anchor Sections (or Anchored Linear Events), and (b) linear referencing tiepoints 502 that relate the linear measure on a traversal to those of on the underlying Anchor Sections. For example, the location specified by the data "Traversal A, mile 0.8" (503) equates to the Anchor LRM reference "Anchor Section 1, offset 0.8," and the location specified by "Traversal A, mile 2.2" equates to the Anchor LRM reference "Anchor Section 2, offset 0.7" (504). The location specified by "Traversal A from mile 0.8 to mile 2.2" equates to the Anchor LRM reference "Anchor Section 1 from offset 0.8 to offset 1.5 (505) plus Anchor Section 2 from offset 0.0 to offset 0.7.

Figure 6:
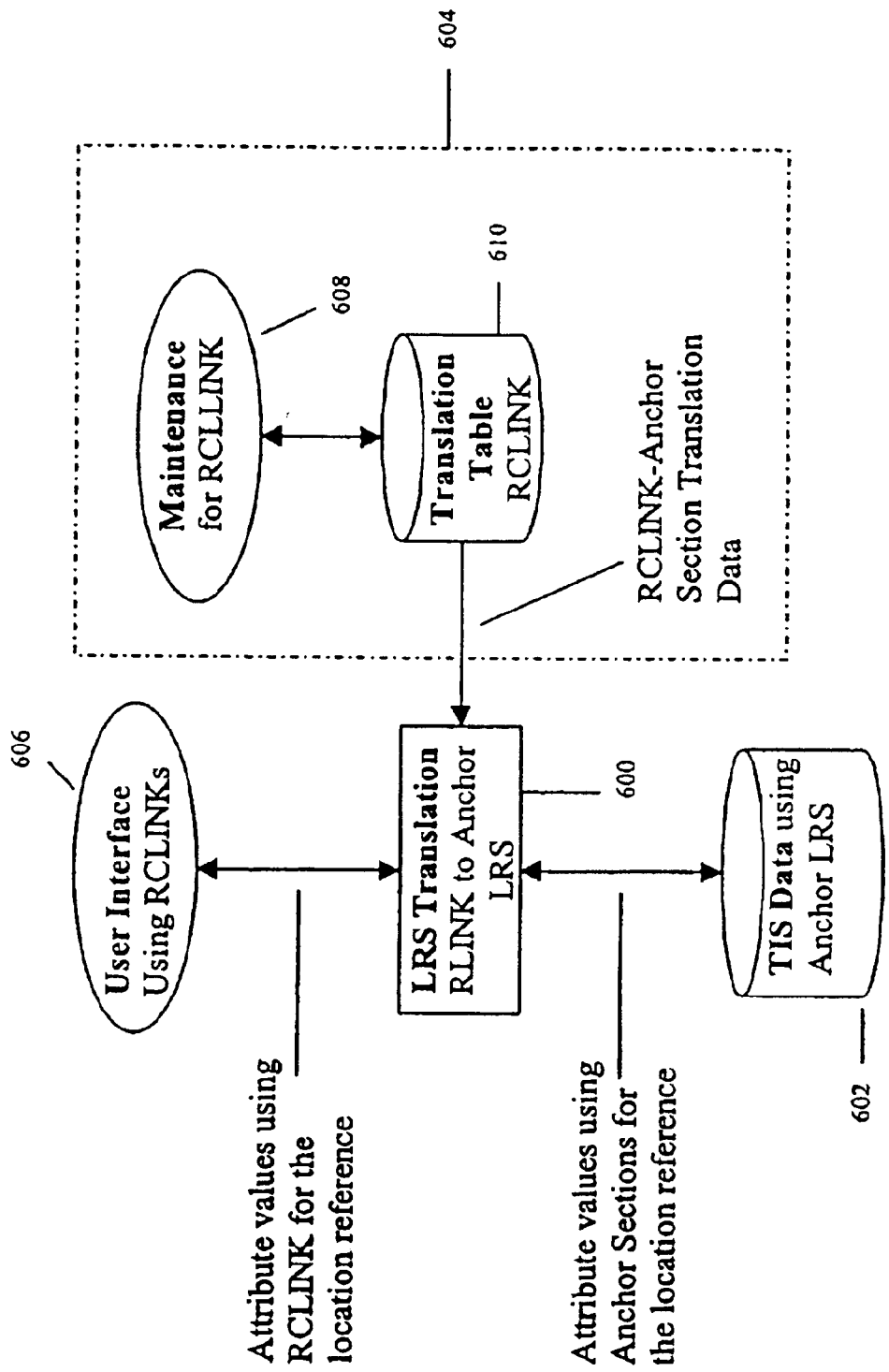
FIG. 6 is a block diagram depicting the translation between linear referencing methods for a linear referencing system used in a network road data model.

When a user enters new data into a TIS application, they enter the data using a familiar LRM. Before storing the data, the TIS application converts the LRM location reference from the familiar LRM to the Anchor LRM. When displaying data for a user, the opposite process is used to convert an Anchor LRM location into a LRM location, of an appropriate type as specified by the user. FIG. 6 illustrates this process for the RCLink LRM. In addition to the LRM translation process for converting between the Anchor LRM and other LRM's, the system also provides user screens for maintaining the LRM translation tables (i.e., for defining the LRM in terms of the underlying Anchor Sections).

Referring now to FIG. 6, the TIS has a linear referencing system (LRS) translation application which serves as a bridge between the TIS data using an Anchor LRS 602 and an existing LRS 604 which uses the RCLink LRM. A user can input or view data in TIS in an existing LRM such as RCLink because the user interface 606 is integrated with an LRS translation application 600 which is able to access translation tables 610 which correlate data using the RCLink LRM with data using the Anchor LRM. The Anchor LRS 604 also has a maintenance application 608 to maintain the translation tables as RCLink data is modified.

Figure 9:
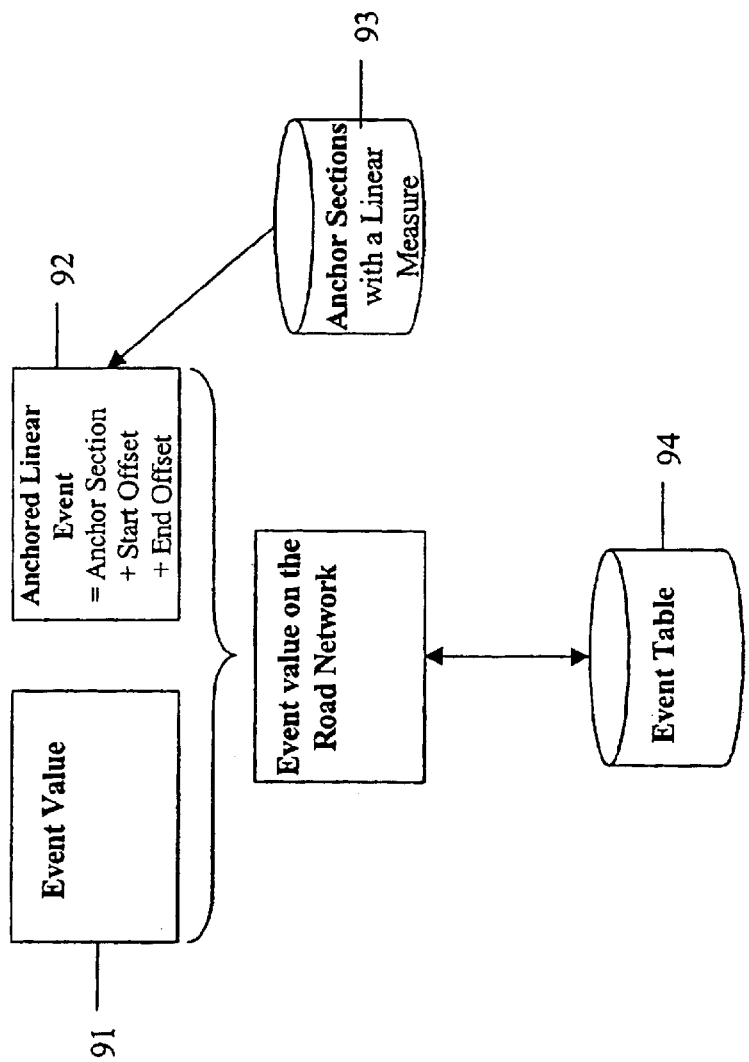
FIG. 9 is a block diagram depicting storing of event data.

Referring now to FIG. 9, the process for storing event data is shown. In TIS, event data (e.g., road characteristic data) is stored in a table that includes columns for (a) the event value 91 and (b) the Anchored Linear Event 92 to which the event applies. Events that span multiple Anchor Sections 93 are stored in multiple rows in the event table 94. An event table can be supplemented by additional columns if more detailed event locations (e.g., road divisions, road lanes) are required.

Figure 7:
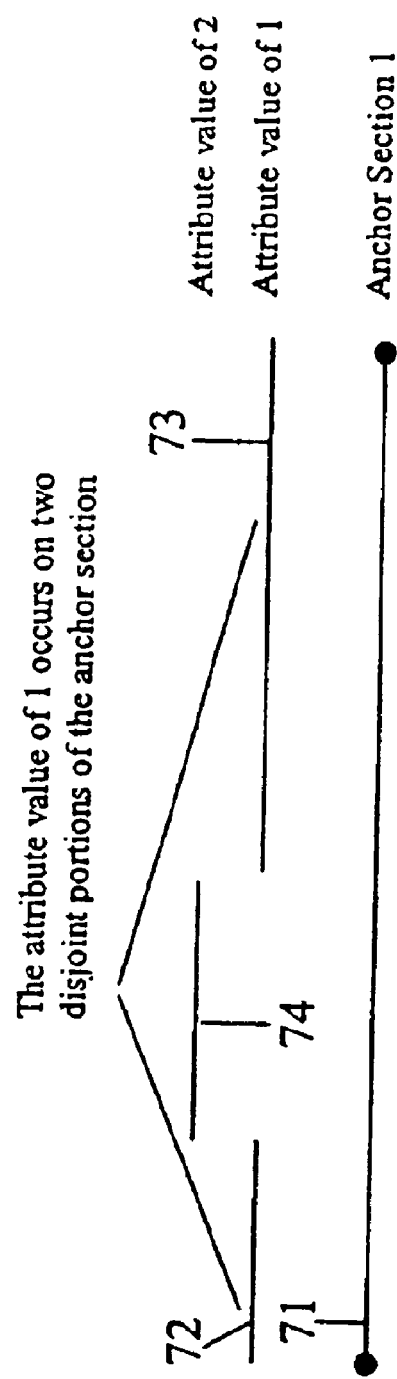
FIG. 7 illustrates disjointed attribute values for an anchor section.

An event value (e.g., pavement type) may apply to several disjoint portions of an Anchor Section. Referring to FIG. 7, an anchor section 71 is shown which has varying attributes for disjoint portions of the section. For instance, portions one (reference 72) and three (reference 73) may be asphalt pavement and portion three (reference 74) may be cement. The event table supports multiple entries for the same Anchor Section and event value. Several methods exist for storing these values, and it would be apparent to one skilled in the art that the exact method chosen will depend on other implementation and design choices. For instance, any of the following methods may be implemented: (a) storing each value-Anchored Linear Event combination in a different table record, (b) storing each value-Anchor Section combination in a different table record with a Blob (binary large object) column that contains the offset information for the Anchored Linear Event(s), (c) storing all event values (for a specific event type) for each Anchor Section in a different record with a Blob column that contains the value that applies to each Anchored Linear Event, and (d) storing each Value-Anchored Linear Event combination in a different table record with the same Anchored Linear Events being used for all TIS event data (i.e., dynamic segmentation).

Figure 8:
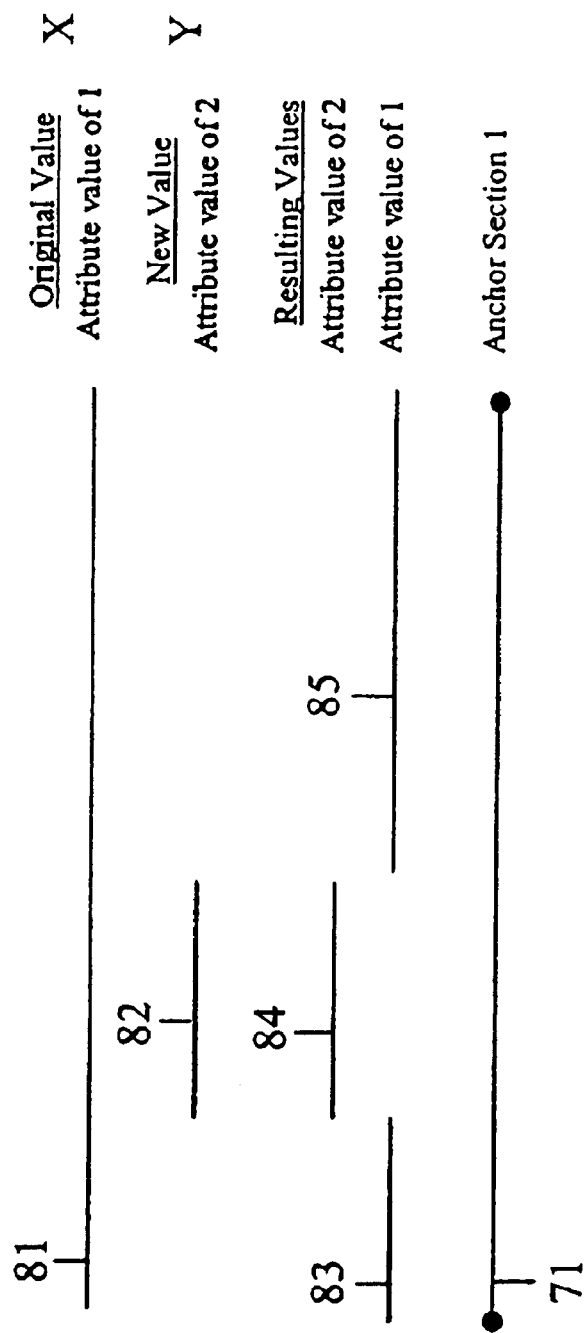
FIG. 8 illustrates a complicated attribute update.

Saving a new event value can result in complicated updates to the current TIS database (see FIG. 1). For example, referring to FIG. 8, suppose the pavement type currently has value X 81 along an entire Anchor Section 71, and a new value Y 82 is entered from offset 30% to offset 50%. Then the new value is X from offset 0% to 30% (reference 83), Y from offset 30% to 50% (reference 84), and X from offset 50% to 100% (reference 85). Using Method (a), above, this would be stored in three (3) event table rows, one for each Anchored Linear Event. Using Method (b), this would be stored in two (2) event table rows, one for each event value. Using Method (c), this would be stored in one (1) event table row. The number of rows required using Method (d) would depend on the current segmentation for the given Anchor Section, and it is possible that event tables for every event associated with this Anchor Section would require updating.

The method used to store the event values has a significant impact on the use of queries to access the TIS data. Methods (a), (b), and (d) support simple queries based on a single event attribute. (Method (c) does not because the event value is "hidden" inside the Blob.) Only Method (d) supports simple queries for multiple event attributes; the other methods require implementing some program logic to calculate the intersection and/or union of the Anchored Linear Events associated to the event values of interest.

Many of the reports required of the TIS data by GDOT are summaries of event data by jurisdictional area (e.g., county, congressional district). TIS provides two methods of accessing event data by jurisdictional area, both of which are depicted in FIG. 10.

Figure 10:
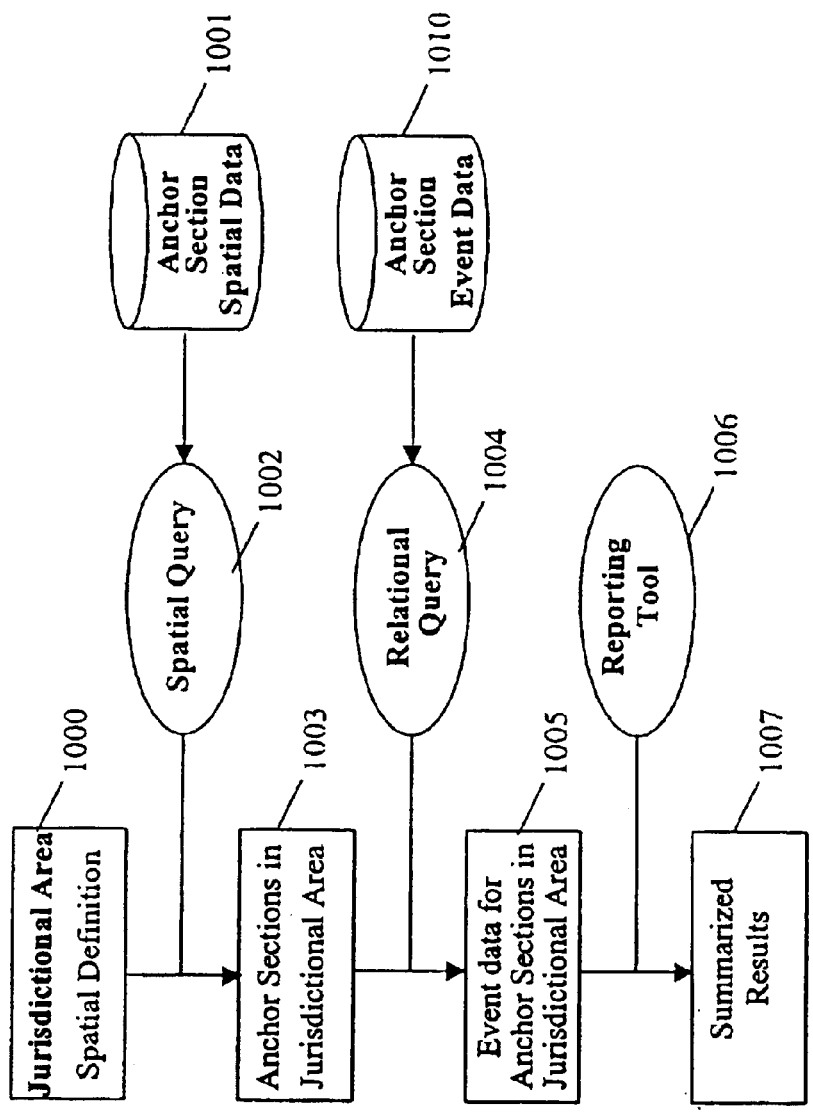
FIG. 10 is a block diagram showing the use of jurisdictional areas.

Referring now to FIG. 10, jurisdictional area polygons 1000 are maintained as spatial TIS data 1001. The user can also create temporary, ad hoc spatial jurisdictional areas for use in querying the TIS data. Event data 1010 for such areas will be accessed by (1) using a spatial query 1002 to identify the Anchor Sections contained within the specified jurisdictional area 1003, (2) using a relational query 1004 to compile the event data for those Anchor Sections 1005, and (3) using a report or summary query 1006 to summarize the Anchor Section event data 1007.

Event tables are used to store the Anchor Sections associated with the most important jurisdictional areas. These event tables facilitate processing by storing the preprocessed result of the spatial query in step 1 above. Event data 1010 for such areas are accessed by applying steps 2 and 3 from above to the stored Anchor Sections for the jurisdictional area.

Modifications of existing ArcInfo applications are used to maintain the jurisdictional data, which will be exported to the TIS database as part of ArcInfo data publication.

In addition to TIS data tied directly to the road network and jurisdictional areas, TIS maintains links to other data that include a spatial component. For example, bridge information management system (BIMS, as implemented in the GDOT system) software maintains information about bridges; TIS includes links to this information. In particular, TIS supports the following sorts of spatial links to other data:

1. Some data is associated with a location on the road network (e.g., a bridge "covers" a portion of a road), then TIS includes the following types of information: (a) a table that describes the object/information, how to link to the source data for this object, and includes spatial data for the object (i.e., a GIS layer) and (b) an event-like table that relates each bridge to the portion of roadway that it covers. The data is accessible both through (a) a GIS map interface, (b) spatial queries, and (c) relational Anchor Section based queries.
2. Other data is not directly associated with a location on the road network (e.g., wetlands), in which case TIS includes a table that describes the object/information, and the data is accessible only through a GIS map interface and spatial queries.

Figure 11:
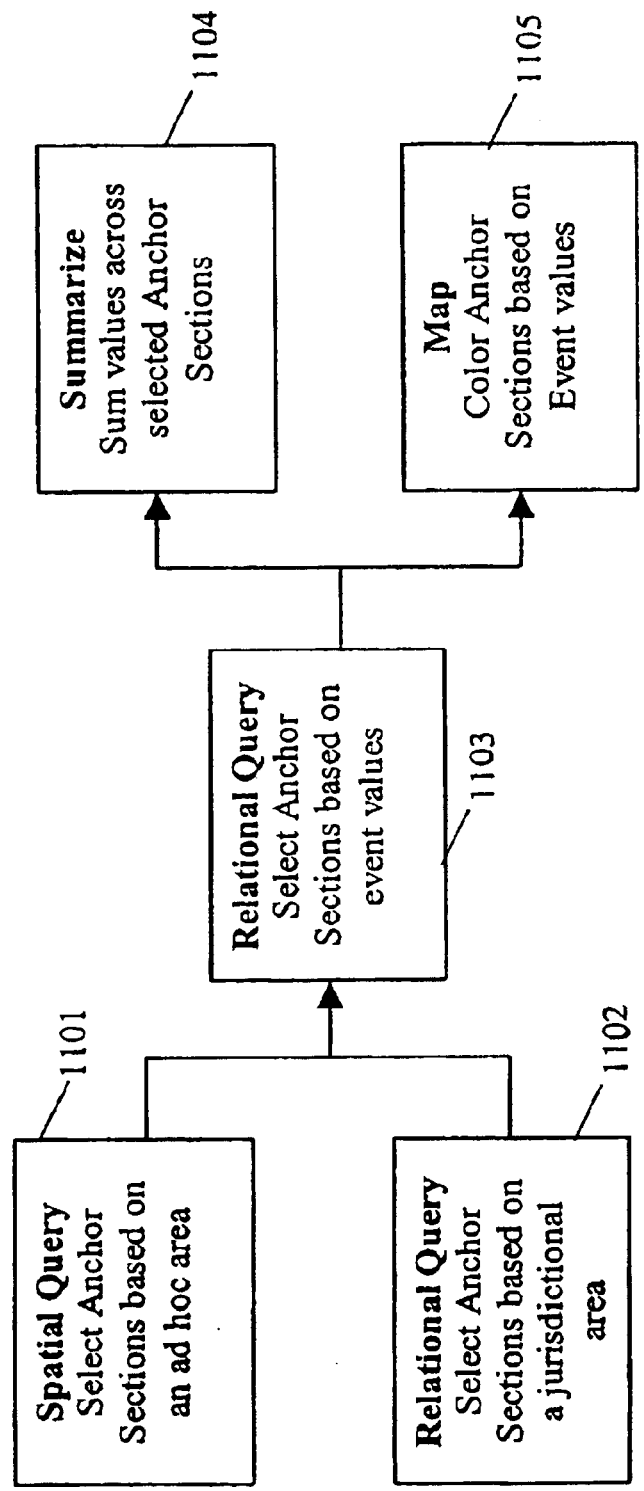
FIG. 11 is a block diagram depicting querying of transportation information system data.

Because the event data is related to Anchor Sections and stored in relational tables, event data can be easily queried and summarized using traditional relational queries. Because the Anchor Section data includes a spatial representation for each Anchor Section, the TIS network data model also supports spatial queries. FIG. 11 illustrates the process that is normally used to query the TIS data.

Referring now to FIG. 11, the first step is to determine the Anchor Sections in the area of interest. This can be done by either (a) using a spatial query based on a temporary, ad hoc area defined via a map interface 1101 or (b) using a relational query based on jurisdictional areas (e.g., counties, congressional districts, project areas) 1102.

Next, this collection of Anchor Sections can be further filtered based on event data associated with the Anchor Sections 1103 (e.g., divided highways with speed limit less than 55 mph). Note that this step cannot always be implemented using a traditional relational query; only portions of an Anchor Section may have the attribute of interest, and selections based on multiple attributes used for length-type summary tables require comparison of Anchored Linear Events. The last step is to either (a) summarize event values for the selected Anchor Sections 1104 or (b) map the selected Anchor Sections 1105.

In many instances, event data will be constant across an Anchor Section, and a comparison operation for event data on an Anchor Section generates either a True or False response for the entire segment. In some instances, the event data will vary across an Anchor Section, and the result of a comparison is True only for a portion of the Anchor Section. In these cases, special processing logic is implemented to support these types of comparison operations.

Much of the data that might be accessed through the system is actually maintained by other applications in separate databases. For some such data, query operations that will extract data from these separate databases is supported, but for other data, access to the data is accessible only by launching an appropriate application.

The Road Network

Initialization of the road network from existing road data may be performed prior to using the system and method. For instance, in the exemplary embodiment, a desired road network is currently maintained as an ArcInfo Link-Node network and will continue to do so after implementation of the exemplary TIS. Therefore, the initialization process must both copy the road network data from the existing ArcInfo formats into a TIS database, but must also update the existing ArcInfo data with additional columns required for maintaining consistency of the ArcInfo and TIS road network data. In order to accomplish this in the context of the GDOT road network, a number of tasks must be accomplished. It will be apparent to one skilled in the art that modifications to columns in existing tabular data and associated query and maintenance methods will vary depending on the architecture of the existing system. The following description illustrates how these modifications should be implemented if the system and method are to be integrated with the GDOT road network data. It will also be apparent to one skilled in the art that these steps may be easily customized for other existing road networks, where the road networks are defined using various linear referencing methods. In the exemplary embodiment the steps necessary to initialize the road network data are described below:

1. Add a column to the ArcInfo Link table(s) to contain the Anchor Section ID of the Anchor Section associated with each Link.
2. Analyze the ArcInfo data to ensure that it is consistent with the TIS road centerline model. In particular, note any divided highways that are represented by parallel links.
3. Create an entry in the Anchor Section table for each Link in the ArcInfo table, assign an Anchor Section ID to the entry, copy the spatial data (i.e., the polyline) from ArcInfo to the TIS database, and copy any additional data from ArcInfo that is necessary to define the road network (including the segment length, whether this segment is internal to an intersection, whether the segment is a divided roadway).
4. Update the ArcInfo Link table with the Anchor Section ID.

Once this base data is imported, it serves as the basis for the location specifications in the remainder of the data imports. Further, once imported, the TIS data must then be maintained. The TIS database consists of the following primary components: road network data; linear referencing methods; road characteristic, and other event data; and other spatial data. Each of these categories of data requires maintenance procedures specific to the type of data. It will be apparent to one skilled in the art how to maintain the varying types of information based on the database architecture.

The means by which the TIS data is maintained in the TSAF database is the data model of the present invention. An exemplary embodiment of this data model is described below.

Model Overview

The TSAF database and software establish a spatially-enabled database that provides enterprise-wide access to data tied to the road network. The Oracle® database engine supplemented by the ESRI, Inc. Spatial Data Engine (SDE) middle-ware provides the core database functionality for this system. This functionality is extended to provide enterprise-wide access to the data through custom map, report, and data server applications that can be accessed through a Web browser. These elements form the technology base for the system. Because an off-the-shelf database (e.g. Oracle) and off-the-shelf spatial data engine (e.g., SDE middle-ware from ESRI, Inc.) are used, the system is implemented using an open architecture which allows easy access to the TIS data. The following elements are added to this open technology base to deliver the complete system and method:

1. The Road-Division Data Model. The road network is of central concern to users of the data, and the Road-Division Data Model describes how a road network is represented in the database. The primary element of this data model is the Division Section, which represents a physical, linear section of a division of a roadway. Division Sections are linked by Division Nodes, which specify the points at which Division Sections intersect. This representation differs from the traditional link-node networks in that (a) a division node can occur in the interior of a Division Section and (b) the Division Section-Division Node network is specifically designed to represent a road network. This base is completed with (i) road Sections that represent linear sections of a roadway by combining the road division data of Division Sections, (ii) traversals that represent roads and road divisions, (iii) Intersects that represent intersections between roads, (iv) Lanes that represent individual lanes, and (v) Mileposts that provide a second linear referencing method along some Traversals.

2. The Entity-Attribute Data Model. The TSAF database stores a large number of data items. In order to simplify the user's view of these items, an object-oriented view of the data is provided. Every piece of data maintained by the system is associated with an "Entity". This is done with the Entity-Attribute Data Model. For example, a road characteristic is associated with a road Entity and the length of a bridge is associated with a bridge Entity. The individual pieces of data associated with an Entity are known as attributes.

The Entity-Attribute Data Model does more than provide a simplified view of the data. Because dynamic segmentation is used to store locations along the road network (e.g., where road characteristic values apply), the queries necessary to view data can be very complicated. The Entity-Attribute Data Model provides a method so that the user can easily specify a query (in terms of Entities and attributes), and this query specification can be resolved into an SQL statement that performs the requested query. In this case, the model not only facilitates the specification of the query, but also simplifies the programming necessary to generate the SQL statement that performs the query.

Figure 13:
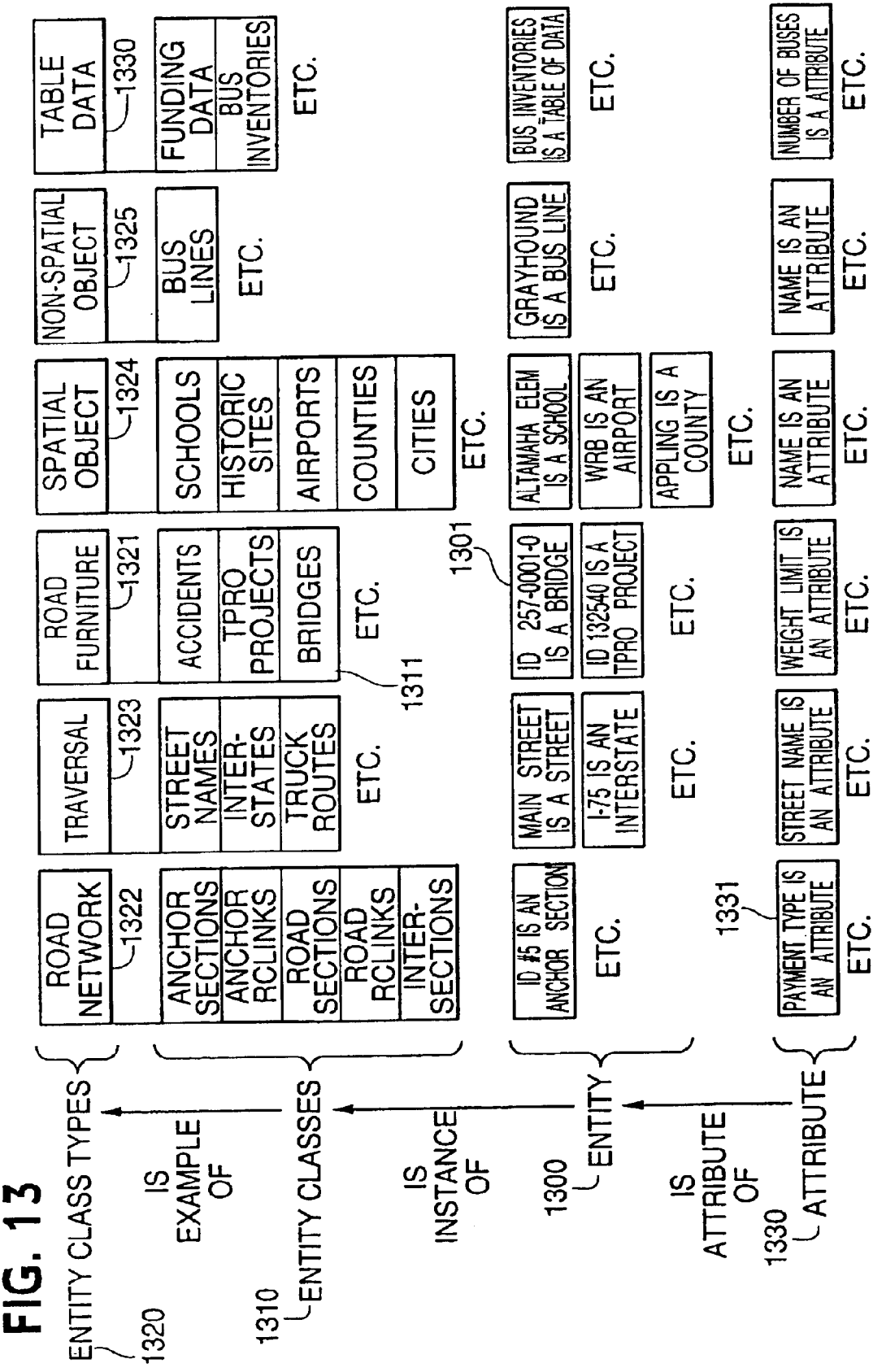
FIG. 13 is a block diagram showing Entity class types, Entity classes and Entities of a Entity-attribute data model, in accordance with the system and method.

Referring now to FIG. 13, there is shown is a block diagram showing Entity class types, Entity classes and Entities of the Entity-Attribute Data Model. The Entity-Attribute Data Model achieves this simplification by associating each type of Entity 1300 with a table structure that contains data for that Entity. In particular, each Entity (e.g., a bridge 1301) is part of an Entity class 1310 (e.g., bridges 1311), which has an associated Entity class type 1320 (e.g., road furniture 1321). Each Entity class type 1320 has an associated physical table structure that specifies how data for Entities with that Entity class type are stored. It will be apparent to one skilled in the art that various table structures can be used to implement the system and method, and the examples herein are merely one embodiment.

Just as there are several different types of Entities with a physical table structure associated with each type, there are two basic types of attributes 1330 with associated physical table structures. Dynamic segmentation attributes are attributes that are defined for only a sub-section of a linear Entity; in TSAF, these attributes only apply to Division Section and road Section Entities. For example, pavement type 1331 is a dynamic segmentation attribute of a Division Section. Entity attributes are attributes that apply to an entire Entity. For example, the county name is an Entity attribute of a county Entity.

3. The Map Data Model. The ability to generate and display maps, in addition to tabular data is an advantage of the system and method. This is provided by the Map Data Model. In the exemplary embodiment, this functionality is provided through the use of (a) the ESRI SDE middle-ware, which allows a column of spatial data to be added to an Oracle® table, and (b) the ESRI Map Objects software that facilitates generation of maps based on Oracle® SDE tables. This basic functionality is augmented with tools for (a) generating map layers that display faster than Division Section based map layers and (b) automating the maintenance process for the maps. For example, if the speed limit for a section of road is altered, then every map layer that relies on the altered speed limit data must be modified. This could include multiple speed limit maps that are appropriate at different zoom levels, as well as other maps that combine speed limit data with other data (e.g., a speed limit in school zones map).

4. The Query Model. The ability to generate relational queries that report on the data is an additional advantage of the system. This is provided by the Query Model. Most data is stored in Oracle® tables with location information represented by dynamic segmentation tables related to the Division Sections. One advantage of this representation is that users can perform queries of this data, including some queries that are spatial in nature, using purely relational query tools. This results in much broader access to data throughout the user community and much faster response time when performing queries. One disadvantage of this representation is that the SQL statements necessary to perform these queries can be complicated.

5. The Location Referencing Model. The data model uses dynamic segmentation to identify the location of most road-related data. For data that is tied to road-divisions, dynamic segmentation tables that are related to Division Sections are used. For data that is tied to the entire road, dynamic segmentation tables that are related to Road Sections are used. This internal representation (based on Anchor or Road Section ID and percentage offset) is typically not appropriate for user interactions.

The fundamental location referencing method for users of the exemplary system is RCLink and milepoints along that RCLink. The Road-Division Data Model also defines Mileposts, which establish a second location referencing method based on RCLink name and mileposts.

Other location referencing methods in addition to those supported directly by the Road-Division Data Model are provided. Street names are supported through the use of the traversal Entity class type. RCLinks are simply a system-required implementation of a Traversal. Street addresses are supported through address tables.

6. The Data Maintenance Model. The data is not static, but is updated continuously by different organizations within the user community. This is done by the Data Maintenance Model. A number of factors make the data maintenance process complicated. For example, historical values must be maintained for most data, and maps are derived from both the current and historical values. The data maintenance process must automatically maintain both the historical values and any associated maps whenever data changes. Also, user work practices may not ensure synchronized updates to the data (e.g., the road collection bureau may collect information about a road before that road has been mapped). The data maintenance process must prevent data corruption that could result from such unsynchronized updates.

7. The Data Dictionary Model. One of the goals of the system and method is to build a database that is extensible, so that new data can be added to the databases with reduced reprogramming. To meet this goal, a Data Dictionary is included as part of the Data Dictionary Model, which maintains meta-data about the data. For example, the Data Dictionary maintains the definitions of map layers so that the data maintenance routines can determine the map layers that could be affected by a data change. Because the meta-data that defines data elements is contained in a Data Dictionary rather than in software, new data elements can be added simply by updating the Data Dictionary.

The Data Dictionary Model is the sum of each of these afore-mentioned individual elements which are described in more detail below. It should be noted that the following description is in the context of the exemplary embodiment and that it will be apparent to one skilled in the art how to customize the data models and Data Dictionary for other implementations of physical networks that can be represented by anchor sections and linear referencing methods.

The Road-Division Data Model

The Road-Division Data Model provides two parallel views of the road network: (1) a division-level view that depicts the road network as a collection of Division Sections, each representing a linear section of a physical division of a road, and (2) a road-level view that depicts the road network as a collection of Road Sections, each representing a linear section of a road. Both Division Sections and Road Sections are representations of the more abstract Anchor Section. FIG. 3 illustrates that a single actual road network 300 can be represented in both road section form 310 and Division Section form 320. These two views of the road network are implemented using the following road network Entities (see FIG. 12).

Figure 12:
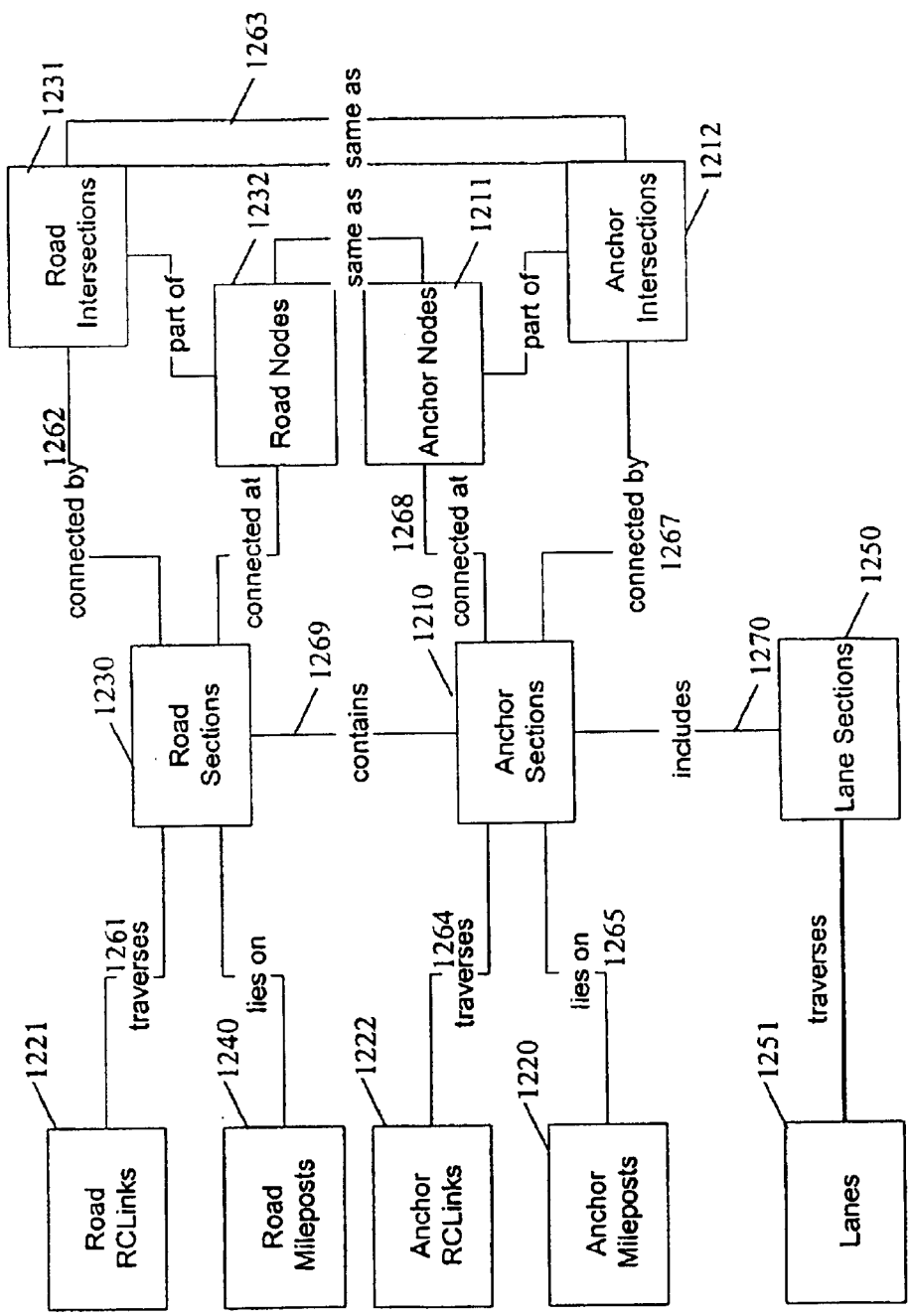
FIG. 12 is a block diagram showing an overview of a road division data model, in accordance with the system and method.

Referring now to FIG. 12, there is shown a block diagram overview of the Road Division Data Model, as described below:

Division Section. A Division Section 1210 represents a linear section of a physical division of a road. For a divided roadway, each division should be represented by a series of Division Sections that join end-to-end to represent the entire road division. An undivided roadway is represented as a single division. The places where Division Sections physically intersect are represented by Division Nodes 1211. Each Division Section is an Entity (as defined hereafter), and therefore has a unique ID and associated Attributes that can be used to associate values to positions in the road network.

Division Node. A Division Node 1211, which may occur at either end or in the interior of a Division Section, represents the physical intersection between two or more Division Sections. The ability to represent an interior intersection (i.e., interior Node) without re-segmenting the Anchor Section (e.g., Division Section or Road Section) is a significant advantage of the system over the prior art.

Division Intersection. A Division Intersection 1212 represents an intersection (e.g., a simple at-grade crossing, a complex interchange) between two or more roads. Each Division Intersection 1212 is an Entity and, therefore, has a unique ID and associated attributes that can be used to associate values to the intersections in the road network.

Division RCLink. A Division RCLink 1222 defines the primary name and mileage references for each section of road-division in the road network, establishing a milepoint-based linear referencing method for the road divisions. Each Division RCLink 1222 is an Entity, and therefore has a unique ID and associated attributes that can be used to associate values to the road-divisions in the road network.

Anchor Mileposts. Anchor Mileposts 1220 define the physical location of mile posts along the road network. When combined with RCLinks 1221, 1222 (or other Traversals), mileposts establish an alternative linear referencing method.

Road Section. A Road Section 1230 represents a linear section of a physical road. Each Road Section is an Entity, and therefore has a unique ID and associated attributes that can be used to associate values to positions in the road network. Road Sections are only defined for through roads (i.e., not for ramps, collectors, and distributors).

Road Node. A Road Node 1232, which may occur at either end or in the interior of a Road Section 1230, represents the physical intersection between two or more Road Sections 1230.

Road Intersection. A Road Intersection 1231 represents an intersection (e.g., a simple at-grade crossing, a complex interchange) between two or more roads. Each Road Intersection is an Entity, and therefore has a unique ID and associated attributes that can be used to associate values to the intersections in the road network.

Road RCLink. A Road RCLink 1221 defines the primary name and mileage reference for each section of road in the road network, establishing a milepoint-based linear referencing method for the roads. Each Road RCLink 1221 is an Entity, and therefore has a unique ID and associated Attributes that can be used to associate values to the roads in the road network.

Road Mileposts. Road Mileposts 1240 define the physical location of mile posts along the road network. When combined with RCLinks 1221, 1222 (or other Traversals), mileposts establish an alternative linear referencing method.

Lane Section. A Lane Section 1250 represents the portion of a lane that is contained within a Division Section. Lane Sections are defined for all lanes of a Division Section.

Lane. A Lane 1251 represents a physical lane that is defined as the union of a sequence of contiguous Lane Sections.

The Road-Division Data Model is characterized not only by the objects within the model, but also by the properties associated with these objects and the relationships between them. There are properties associated to each object in the data model and these properties are used to support data model specific functionality. For example, the length property of a Division Section specifies the length of that Division Section in miles and is used to calculate road-miles, division-miles, and lane-miles for reports. The relationships between the objects in the road model are also used to support data model specific functionality. For example, the fact that there is a one-to-many (non dynamic segmentation) relationship between Road Sections and Division Sections is used to support rolling up and down of values between Road Sections and Division Sections. The relationships depicted in FIG. 12 are summarized in the following list:

Road RCLink traverses Road Sections (1261). A Road RCLink is defined as an ordered sequence of sub-sections of Road Sections.

Road Sections connected by Road Intersections (1262). Intersections between Road Sections are indicated by Road Intersections.

Road Intersections are equivalent to Division Intersections (1263). Road Intersections and Division Intersections are different representations of the same physical intersections.

Division RCLink traverses Division Sections (1264). A Division RCLink is defined as an ordered sequence of sub-sections of Division Sections.

Mileposts lie on Division Sections (1265). Mileposts exist at locations on Division Sections.

Division Sections connected by Division Intersections (1267). Intersections between those Division Sections that are part of a mainline road are indicated by Division Intersections.

Division Sections connected by Division Nodes (1268). Intersections between Division Sections are indicated by Division Nodes.

Road Section defined by Division Sections (1269). A Road Section is defined by the Division Sections (i.e., divisions of that road) that it contains.

Division Section includes Lanes (1270). A Lane is included in a Division Section.

In addition to the objects and relationships listed above, there are a number of other general concepts that apply across the Road-Division Data Model. These concepts are described below:

Entity. The term Entity refers to a real-world object about which the system maintains data. Thus, most of the objects depicted in FIG. 12 qualify as Entities. Each Entity is identified by an Entity class ID, which describes the type of Entity, and an Entity ID, which identifies a specific Entity within that Entity class. In general, each Entity has an associated Entity table in which the Entity IDs are enumerated and each row of the table corresponds to a specific Entity. Other tables may be associated with the Entity in order to store other information about that Entity.

Properties and Attributes. In addition to the Entity ID, two other types of information about each Entity are maintained. A Property refers to information about an Entity that is required and is often automatically maintained by the software or by required maintenance practices. For example, the shape data associated with an Entity is a property. An Attribute refers to user-defined information about an Entity. In other words, Attributes are the information that the user would normally think they are using, and Properties are the background information that is used to satisfy user requests. Properties and Attributes are usually stored in Property or Attribute tables, though they can also be stored directly in Entity tables.

Historical Data. A continuous historical archive of most TSAF data is maintained by associating a begin date and end date to each item, where the dates indicate the period of time during which a piece of data was current. In the property tables in the following sections, the notation "Historical" indicates that a historical archive is maintained for the values of the indicated property. Each table that is used to maintain historical data must include begin date and end date columns to indicate the period during which each row of the table is valid. If an end date is null, then the valid period is any time on or after the specified begin date; otherwise, the valid period is any time on or after the specified begin date, but before the specified end date.

Dynamic Segmentation. Dynamic segmentation of an Anchor Section means that the Section can be dynamically and virtually segmented by creating interior intersections or multiple varying properties associated with portions of the Anchor Section without forcing the section to be segmented into multiple sections, where each new section would have the new property or intersection associated with it. For linear objects, some properties vary along the length of that object (linear properties) and others occur at a specific point along that object (point properties). For example, the through lane count may vary along a Division Section. If dynamic segmentation is allowed for an object, then the object has a property that indicates as such in its property table. Each table that is used to maintain linear dynamic segmentation data has an ID column identifying the object to which a row in the table applies, a "begin percent" column indicating the position along that object (expressed as a percentage of the total length) at which the row begins to apply, and an "end percent" column indicating the position along that object (expressed as a percentage of the total length) at which the row ceases to apply. Each table that is used to maintain point dynamic segmentation data has an ID column and a percent column indicating the position at which that property occurs.

The Entity-Attribute Data Model

The primary goal of the exemplary embodiment is to maintain and facilitate access to data that describes a road network. This data can be placed into three broad categories: (1) road network data, which defines the roads, (2) road characteristic data, which defines characteristics of the road (e.g., pavement type), and (3) other data, which may or may not be associated with positions in the road network. In order to help automate processing and maintenance of this data and to simplify user access to this data, an object-oriented view of all data is implemented. For example, pavement type data is associated with the road object. The Entity-Attribute Data Model (see FIG. 13), as discussed above, specifies the details of how this object-oriented view of data is implemented.

In addition to the definition of Entities and Attributes as defined in the system and method, the definition of relationships between Entities is also defined. For example, the "county" Entity is related to "road section" Entities because each road section has a county attribute indicating the county in which that road section is located. Then, the fundamental elements of system and method data are the Entity, the Attribute, and the Entity relationship.

Figure 14:
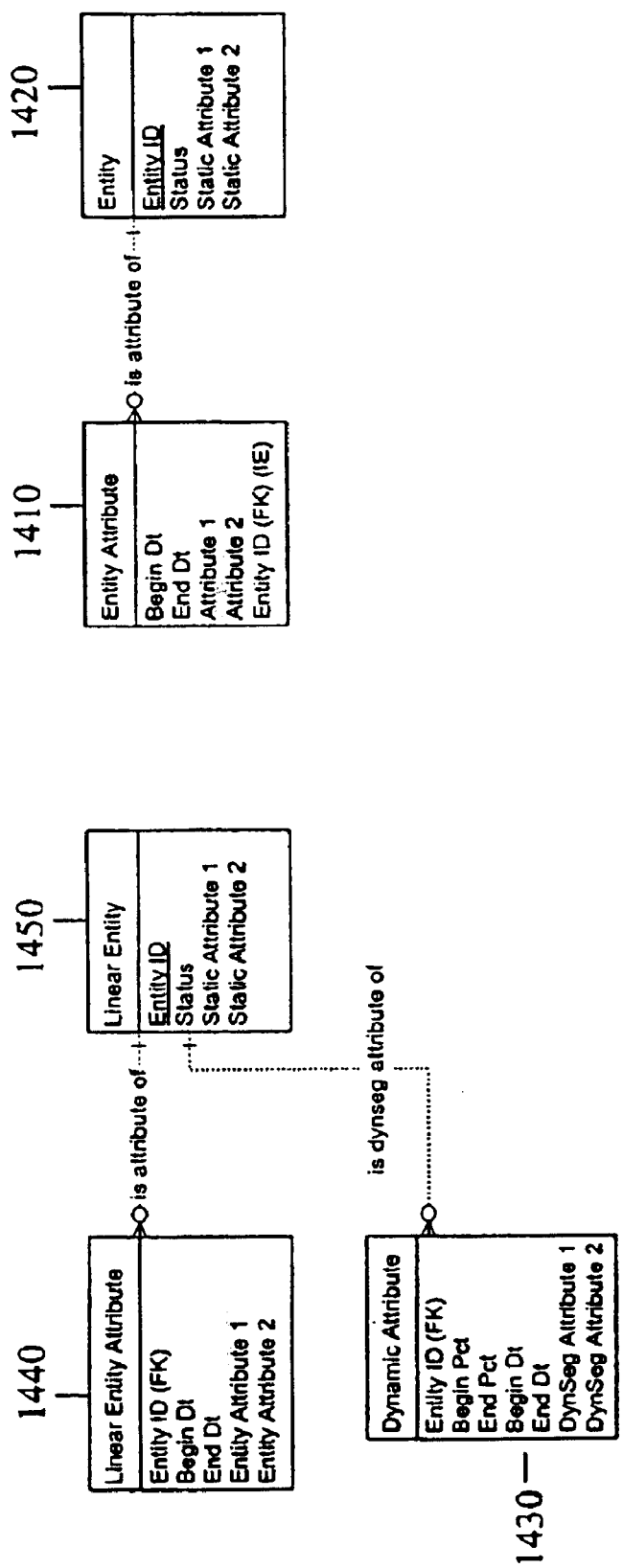
FIG. 14 is a diagram showing attribute table structure, in accordance with the system and method.

Referring now to FIG. 14, there is shown the Attribute Table structure. An Attribute is a data value that is associated with a specific Entity. For example, the weight limit of a bridge is an Attribute that is associated with a bridge Entity. Three (3) primary types of Attributes are supported by the model. An historical Entity Attribute 1410 and 1440, like the bridge weight limit, is a value that applies to an entire Entity and that may vary over time. A static Entity Attribute 1420 and 1450 is a value that applies to an entire Entity and that applies during the entire life of that Entity. A dynamic segmentation Attribute 1430, on the other hand, applies to only a sub-section of a linear Entity. In the exemplary embodiment, dynamic segmentation Attributes only apply to the Division Section and Road Section Entities. Note that static Entity Attributes 1420 can be stored in the same table that defines the Entity, but historical Entity Attributes 1410 and dynamic segmentation Attributes 1430 must be stored in different tables. An historical Entity Attribute 1440 of a linear Entity 1450, like the length of an Anchor Section, is a value that applies to an entire linear Entity and that may vary over time. A static Entity Attribute of a linear Entity 1450 is a value that applies to an entire linear Entity and applies during the entire life of that Entity.

In addition to the two primary types of Attributes, which define the basic table structure used for storing Attribute data, a number of other factors can influence how Attribute data is stored and maintained in the system. For example, Attributes can be either single-valued or multi-valued. A single-valued Attribute can only have a single value that applies to an Entity at any point in time (or, for a dynamic segmentation Attribute, at any point in time for any sub-section of the Entity). A multi-valued Attribute can have multiple values at any point in time. Each Attribute is completely characterized by a number of Properties that define these differences between the Attributes. The following list describes Properties of Attributes that affect how Attribute data are stored and maintained:

Attribute Name. Each Attribute has a name that is unique within the Entity class to which the Attribute is associated. This Property specifies the name of an Attribute.

Attribute Join Type. Different Attributes are related to the parent Entity in different ways. For example, an Attribute might be stored directly in the parent Entity table or in an associated table. The Attribute Join Type identifies how an Attribute is related to its parent Entity.

Table Name and Column Name. Most TSAF Attributes are directly related to a specific column in a specific Application Table. For such an Attribute, these Properties specify the name of the table and the column in that table used to store the Attribute value. For a derived Attribute, the table name does not apply and the column name specifies the alias name that will identify the derived values in a query result. For a calculated Attribute, these Properties indicate the table and column name in which the calculated value is stored.

Geometry Type. Some dynamic segmentation data may refer to linear events (e.g., pavement type) while others refer point events (e.g., pothole location). For a dynamic segmentation Attribute, this Property indicates whether the Attribute is a linear or a point Attribute. A table used to store point dynamic segmentation Attributes only requires a single offset column (Loc_Pct). A table used to store linear dynamic segmentation Attributes requires two offset columns (Beg_Pct and End_Pct).

Point attributes cannot be single-valued. Point attributes can be stored in a table with linear dynamic segmentation attributes, in which case the point attribute applies at the Beg_Pct offset.

Location Type. Dynamic segmentation allows TSAF to reference linear sub-sections along a Road or Division Section. However, some Attributes may refer to locations that are either sub-sections across a Road or Division Section or a position on a Road or Division Section. For example, a county line may run down the middle of a road, and half of the road should lie in each county. The location type Property differentiates between the following four types of dynamic segmentation location:

1. A full location type indicates that an Attribute applies to the entire width of the Anchor/Road Section. For example, whether a road has limited access control applies to the road, not to a portion of the road. The prototype tables shown in FIG. 17 assume the Attribute applies to the entire width, so they require no tuning if this option is selected.

2. A directional location type indicates that an Attribute may have a different value for each direction of travel. For example, a county line often runs down the middle of a county line road, in which case the two halves of the road (divided by direction of travel) are in different counties. In this case, the prototype table structure must be modified by adding a Direction column to the Attribute table.

3. A road position location type indicates that an Attribute refers to position either on or beside the road. For example, a sign could be located at either side of a Road Division or overhead. In this case, the prototype table structure is modified by adding a Side column to the Attribute table.

4. A road-side position location type indicates that an Attribute refers to a position beside (but not on) the road. For example, a barrier could be located at either side of a Road Division, but not on the road itself. In this case, the prototype table structure is modified by adding a Side column to the Attribute table.

History Type. TSAF maintains a continuous historical archive of most Attribute values by date stamping rows in attribute tables. However, the historical archive may not be maintained for all Attributes. This Property indicates the type of historical information that is maintained for this Attribute by taking on one of the following three values:

1. No history indicates that no historical archive is maintained for the Attribute.

2. Continuous history indicates that a continuous historical archive is automatically maintained for the Attribute.

3. Snapshot history indicates that a snapshot historical archive is available so that a system user can periodically save a snapshot of the attribute values.

An Entity, as previously generally defined, and as noted, is a representation of a real-world object about which the system maintains information in the form of Attributes. Each Entity is identifiable by a unique ID, previously discussed as including a class ID, and is further detailed hereafter. Thus, most data can be accessed by specifying (a) the unique ID for an Entity and (b) the name of the Attribute of interest. (For some Entities, dynamic segmentation is used to store Attributes that may vary along the length of the Entity, and this specification would return a list of linear sub-sections of the Entity and values within each sub-section.)

In order to facilitate maintenance of this data, the Entities are organized into Entity classes. For example, each bridge Entity is part of the bridge Entity class. The data is organized for each Entity according to its Entity class, and applies the same maintenance practices to each Entity in the same Entity class. For example, every bridge Entity has the same collection of possible Attributes that are maintained in the same way because every bridge Entity is part of the same bridge Entity class. The Data Dictionary contains meta-data (e.g., table names, column names, whether history is maintained) about each Entity class that describe how the data associated with the Entities in that Entity class is stored and maintained.

For the exemplary embodiment, six Entity class types are implemented which define the primary characteristics of the data that can be stored in the road network system. It will be apparent to one skilled in the art that when the system and method are implemented to represent a network of sections other than for a road network, or for other applications of road networks, that different classes of Entities must be defined. A prototype table structure is defined for each Entity class type, and every Entity class with the same Entity class type uses the same table structure to contain its data. The Data Dictionary does include some Entity class parameters that will tune the prototype table structure for a particular Entity class, but the basic table structure for all Entity classes within an Entity class type is identical. It is the definition of the Entity class types and the Data Dictionary meta-data that provides flexibility and extensibility in the system by allowing development of data maintenance and presentation software that is only dependent on the six defined Entity class types, not on the potentially hundreds of specific Entity classes. The following list describes the Entity class types supported by the system of the exemplary embodiment:

Road Network Entity Class Type. The Road Entity Class Type refers to the objects that make up the road network. All road characteristic data is associated to the Road Entity Class Type through the Division Sections.

Traversal Entity Class Type. The Traversal Entity Class Type refers to linear stretches of road (e.g., streets) defined by a sequence of adjacent sub-sections of Division Sections or Road Sections. For example, interstate highways would be implemented as a Traversal Entity Class Type. Traversals formed from Division Sections are called Anchor Traversals, and those formed from Road Sections are called Road Traversals.

Road Furniture Entity Class Type. The Road Furniture Entity Class Type refers to objects that have an associated roadway position (e.g., accidents, road improvement projects, street signs).

Spatial Object Entity Class Type. The Spatial Object Entity Class Type refers to objects that have a specific location, but whose location is not tied to the road network. In some cases a location might be tied to the road network in the real world, but the available source data provides coordinate locations for the data rather than road locations. For example, airports, counties, and schools are implemented in the Spatial Object Entity Class Type. In some cases, a collection of spatial objects might be used to populate a road characteristic value. For example, the county road characteristic value could be populated from the county spatial object county boundaries.

Non-spatial Object Entity Class Type. The Non-spatial Object Entity Class Type refers to objects that do not have any specific location associated to them. For example, bus lines could be treated in the Non-spatial Objects Entity Class Type. If an object-oriented view of this data is not desirable, the Table Entity Class Type can be used instead.

Table Entity Class Type. The Table Entity Class Type refers to tables of data for which an object-oriented view is not appropriate. For example, data from legacy systems may be organized in tables that do not fit an object-oriented view of the data.

As with most relational database systems, a significant part of the power of the system is not simply the data stored within it, but is the ability to relate these data elements together. A large number of the most important data relationships are built directly into the Data Model. For example, a road furniture Entity is naturally related to the sections of road on which that road furniture lies. Because so many elements in the system are related to the roadway, it is relatively easy to perform powerful queries that use the roadway to relate different types of data. For example, the query "count the number of accidents that occurred on roads with the speed limit greater than 60 mph" can be generated because accidents are related to road sections and road sections have a speed limit attribute; the road sections (i.e., Road Section ID and Division Section ID values) are the join field relating these two types of data.

Although the relationships between the Entity class types define many of the key relationships that will be used to query the data, these relationships are based on general relationships between types of defined Entities. Some relationships are based on the particular Entities involved and, therefore, are neither listed in this table nor part of a relationship that can be derived from the data model. For example, a table Entity containing road maintenance expenditure data may include a column that contains the standard code of the county in which the expenditure was made. The presence of this column establishes a relationship between the rows in this table and the county Entities. These Entity-specific relationships are represented as "Relates", which have the following properties:

Relate ID. Each Relate is identified by a unique numeric ID, the Relate ID.

Relate Entities. Each Relate defines a relationship between two Entity classes, Entity Class 1 and Entity Class 2. This property defines those Entity classes.

Name. The Name is used to refer to the relationship from Entity Class 1 to Entity Class 2. This property is used to help specify ad hoc queries by helping the user select the appropriate relationship between Entities.

Relate Type. The Relate Type specifies the cardinality of a Relate. The cardinality is of the form {one|one (optional)|many|many (optional)} to {one|one (optional)|many|many (optional)}. This property is required in order to tune certain queries. For example, if the user wants to count the number of Entities selected, but the query includes a one-to-many Relate, the query must group by the Entity ID in order to remove multiple records with the same Entity ID before counting.

Relationship. The Relationship property is a string that specifies the "where" clause that should be part of an SQL statement that uses this Relate.

Relate Attributes. The Relate Attributes lists the Attributes that are required to support the "where" clause specified in the Relationship property. The ad hoc query tool uses this property to ensure that all of the tables required to support the Relationship "where" clause are correctly joined as part of the resulting SQL statement.

The Query Model

A feature of system and method is the ability to query the database. For example, each report is based on the results of a query, and the data related to the features on a map are obtained by executing a query. The data model is complicated, making generation of an SQL statement for a query difficult. This difficulty is compounded because dynamic segmentation is used to relate many Entities and attributes to the road network, and queries that resolve dynamic segmentation data are always complicated.

Despite these difficulties, the data model includes a number of features that help simplify generation of queries. First, the Entity-Attribute representation of the data allows most queries to be formed from a very limited list of relationships, as depicted in FIG. 15.

Figure 15:
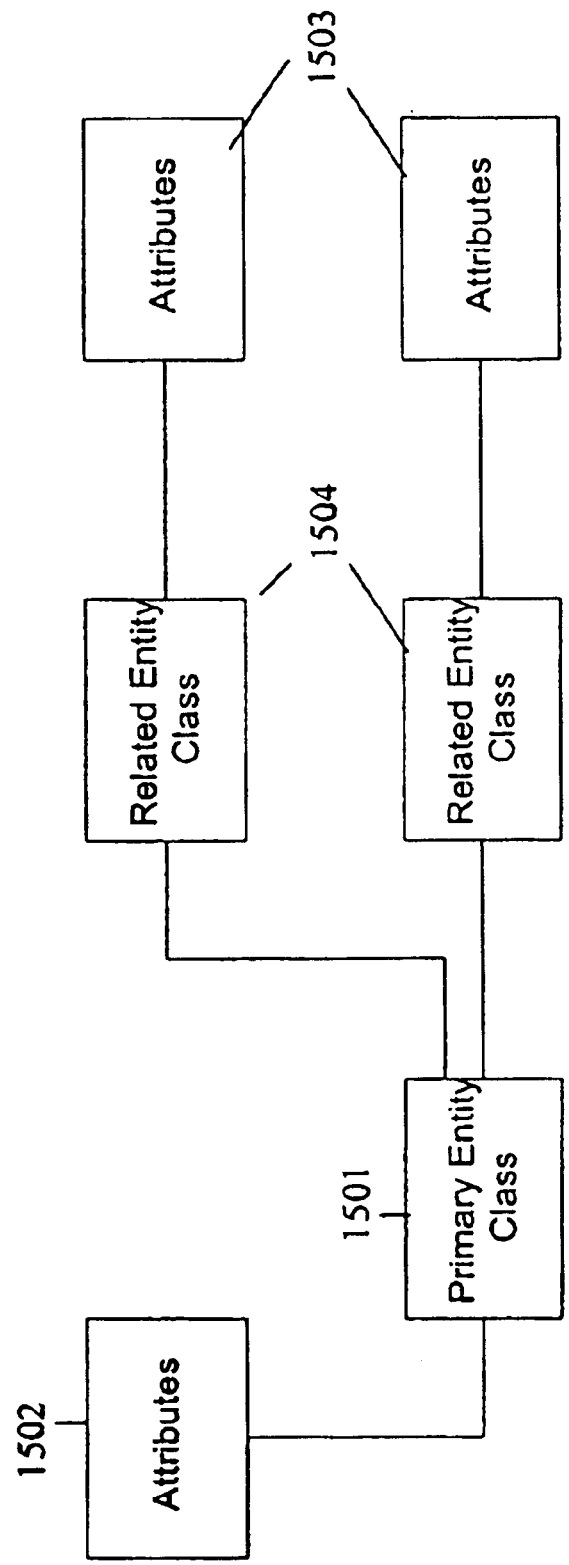
FIG. 15 is a block diagram showing query relationships.

Referring now to FIG. 15, most queries involve a primary Entity class 1501 that determines the type of results that are allowed. For example, for a query that generates a summary report of road-miles or lane-miles, the primary Entity class 1501 is either Road Sections or Division Sections. For a query that generates the sections of county roads on which bridges lie, the primary Entity class is also either Road Sections or Division Sections. For a query that counts the number of bridges on each highway, the primary Entity class is the Bridge Entity.

Attribute columns can be added to a query either by (a) selecting Attributes 1502 of the primary Entity class or (b) selecting Attributes 1503 of an Entity class that is related to the primary Entity class 1504. For example, if the primary Entity class 1501 is the Division Sections, then route type and average annual daily traffic can be part of the query because these are Attributes of the Division Sections. Similarly, bridge type can be part of the query because bridges are related to Division Sections (because they are co-located) and bridge type is an Attribute of the bridges class.

Two types of filters can be used to either (a) select the primary Entities to include in the query result or, when the primary Entity class is Road Sections or Division Sections, (b) select the portions of the Entities to include in the query result. In either case, a filter can be based on Attributes of the primary Entity class or Attributes of a related Entity class.

In the first case, the effect on the query result is obvious; the Entities (or, in case b, portions of the Entities) are restricted to those whose Attributes satisfy the filter constraint. For example, a query could report on the number of road-miles on state routes by filtering by the route type Attribute of the Division Section Entity class.

In the second case, a set of related Entities is selected, and the relationship between the primary Entity class and the related Entity class selects primary Entities (or sections thereof) related to the selected Entities. For example, the number of miles of bridges could be determined by specifying Division Sections as the primary Entity class and using the co-located relationship between bridges and Division Sections to select the portions of the roadway that are on bridges.

Once the primary Entity class, the result Attributes, and the filters have been specified, the usual group by and order by operations can be specified to complete the definition of the query. The following elements are part of creating a query: implementing table relationships; selecting primary Entity classes, and the types of queries that apply to each primary Entity class; including Attributes in queries, and the relationships used to join different Attributes in a single query result; filtering queries; grouping query results; creating columnar results; and converting codes to labels. These elements are described below.

An important concept for understanding and building queries is the relationship between the different types of tables used to store data. All data are stored as Attributes that are associated with an Entity class. Associated with each Entity class are some prototype table structures that are used to store data associated with that Entity class. For the Entity classes as part of the road network data model, the tables used are exactly as defined. For the Entity classes defined as entity Attributes data model, the tables are prototype tables that are "tuned" for each Entity class by altering table and column names and, in some instances, making minor changes to the table structure. The tuning process is controlled by tuning parameters associated with the Entity/Attributes, and the parameters that specify how the tables for an Entity class have been tuned are stored in the Data Dictionary.

The prototype tables defined in the road network data model and the Entity Attributes data model define a small collection of table types. Thus, despite the fact that the database may include hundreds of tables, the relationships between these tables can be understood by defining the relationships that might exist between the different pairs of table types. These relationships can be divided into two groups: (1) relationships between Entity tables and Attribute tables and (2) predefined relationships between Entity tables.

Predefined Entity-Attribute Relationships

Associated with each Entity class is an Entity table that "defines" the Entity IDs for the Entities in that Entity class; in other words, there is a one-to-one correspondence between Entities in that Entity class and rows in the Entity table. For the purpose of understanding this relationship, there are five types of Attributes: static Attributes, Entity Attributes, dynseg (dynamic segment) Attributes, relate Attributes, and lookup Attributes.

A static Attribute is an Attribute that is stored as a column in the Entity table of the parent Entity of that Attribute. Because most Entities allow for historical information and an Entity table does not include historical columns, historical values are not maintained for static Attributes. Also, static Attributes must be single-valued. Because the Attribute is stored directly in the Entity table, no relationship information is required to relate a static Attribute to its parent Entity.

An Entity Attribute is an Attribute that is stored as a column in an Entity Attribute table that is related to the parent Entity table using the Entity ID. An Entity Attribute may include historical values, but that is not necessary, and an Entity Attribute can be either single- or multi-valued. The following describes the preferred method for including an Entity Attribute table in a query, assuming the parent Entity table is included in the query:

1) Add the column name for the Entity Attribute to the SELECT clause.
2) Add the table name for the Attribute table to the FROM clause.
3) Add the following Entity Attribute relationship to the WHERE clause
   AND ([parent Entity table].[Entity ID name]=[Entity Attribute table name].[Entity ID name]).
4) For a historical query of a historical Entity Attribute, add the following historical relationship to the WHERE clause
   AND ([Entity Attribute table name].Begin_Dte< [historical date])
   AND ([historical date]<=NVL([Entity Attribute table name].End_Dte,SYSDATE).
5) For a non-historical query of a historical Entity Attribute, add the following historical relationship to the WHERE clause
   AND ([Entity Attribute table name].End_Dte IS NULL).

A dynseg Attribute is an Attribute that is stored as a column in a dynseg Attribute table that is related to the parent Entity table using the Entity ID, Begin_Pct, and End_Pct. The parent Entity of a dynseg Attribute must be an Entity with a linear geometry. A dynseg Attribute may include historical values, but that is not necessary, and can be either single- or multi-valued. The following is the preferred method for including a dynseg Attribute table in a query, assuming the parent Entity table is included in the query. Because the join required depends on the number of dynseg tables included, the instructions demonstrate how to join two dynseg Attribute tables and describe how to extend this to more than two tables.

1) Add the column name for the dynseg Attributes to the SELECT clause.
2) Add the table names for the dynseg Attribute tables to the FROM clause.
3) To include the dynseg percents in the query results, add the following to the SELECT clause
   GREATEST([dynseg Attribute table name 1].Begin_ Pct, [dynseg Attribute table name 2].Begin_Pct) Begin_Pct,
   LEAST([dynseg Attribute table name 1].End_Pct, [dynseg Attribute table name 2].End_Pct) End_Pct.

To include additional dynseg Attribute tables, add the Begin_Pct of each table to the list of columns in the GREATEST function and add the End_Pct of each table to the list of columns in the LEAST function. If only one dynseg Attribute table is included in the join, the GREATEST and LEAST functions are not required. If other dynseg joins are involved in a query, the GREATEST and LEAST statements must be modified to include the Begin_Pct and End_Pct columns to support these joins.

4) Add the following dynseg Attribute relationship to the WHERE clause
   AND ([parent Entity table].[Entity ID name]=[dynseg Attribute table name].[Entity ID name]
   AND (GREATEST([dynseg Attribute table name 1].Begin_Pct, [dynseg Attribute table name 2].Begin_Pct)<LEAST([dynseg Attribute table name 1].End_Pct, [dynseg Attribute table name 2].End_Pct))

To include additional dynseg Attribute tables, add the Begin_Pct of each table to the list of columns in the GREATEST function and add the End_Pct of each table to the list of columns in the LEAST function. If only one dynseg Attribute table is included in the join, the second half of the relationship (i.e., the relationship associated with the second AND) is not required. If other dynseg joins are involved in a query, the GREATEST and LEAST statements must be modified to include the Begin_Pct and End_Pct columns to support these joins.

5) For a historical query of a historical Entity Attribute, add the following historical relationship to the WHERE clause, one such statement for each historical dynseg Attribute table:
   AND ([dynseg Attribute table name].Begin_Dte)< [historical date])
   AND ([historical date]<=NVL([dynseg Attribute table name].End_Dte,SYSDATE).
6) For a non-historical query of a historical Entity Attribute, add the following historical relationship to the WHERE clause, one such statement for each historical dynseg Attribute table:
   AND ([Entity Attribute table name].End_Dte IS NULL).

A lookup Attribute is an Attribute that is stored as a column in a lookup table that is related to another Attribute. For example, a Paved_Ind Attribute could be implemented as a lookup Attribute associated with a Pavement_Type Attribute by adding a Paved_Ind column to the lookup table that supports the Pavement_Type Attribute. Thus, the relationship between the lookup table and parent Entity table is determined by (a) relating the lookup table to the associated Attribute and (b) relating the associated Attribute to the parent Entity table. The relationship between the lookup Attribute table and the associated Attribute table does not directly support historical queries; instead, the relationship between the associated Attribute table and the parent Entity table is used for historical queries. Note that it is allowed for the associated Attribute table to also be a lookup table. The following preferred method describes how to include a lookup Attribute table in a query, assuming the associated Attribute table is included in the query.

1) Add the column name for the lookup Attributes to the SELECT clause.
2) Add the table name for the lookup Attribute table to the FROM clause. The FROM clause must also include the name of the associated Attribute table.
3) Add the following lookup Attribute relationship to the WHERE clause
   AND ([associated Attribute table].[Attribute column name]=[lookup Attribute table name].[lookup table join column name]

The WHERE clause must also include the relationship required to support the associated Attribute table.

4) For a historical query, no WHERE clause is required to directly support the lookup Attribute. Instead, whatever WHERE clause is required to support a historical query of the associated Attribute must be added to the SQL statement.

A relate Attribute is an Attribute that is stored as a column in a table for which there is no data-model-based relationship between the table and the parent Entity table; instead, an entry in the Relates table defines the relationship. Relate Attributes are always non-historical Attributes. The following preferred method describes how to include a relate Attribute table in a query:

1) Add the column name of the relate Attribute to the SELECT clause.
2) Add the following table names to the FROM clause: the name of the relate Attribute table, the name of the parent Entity table (if it is not already included in the FROM clause), and the names of the Relate Tables, if any.
3) Add the Where_Clause from the Relates table to the WHERE clause.

Predefined Entity-Entity Relationships

The second type of relationship used to support queries are the Entity-Entity relationships, which define relationships between different Entity classes. For example, a Road Traversal Entity class is related to the Road Section Entity class because each road traversal is defined as a collection of sub-sections of road sections. In general, the data model defines a different type of relationship for each ordered pair of Entity classes, representing how an Entity class would be related to a parent Entity class. For example, the Traversal to Section relationship described above indicates how a Road Traversal Entity class would be related to a Road Section Entity class.

In addition to the co-located relationships defined by the data model, other relationships are supported that are defined in a Relates table. The following describes the data model based relationships, as well as how to use relationships defined in the Relates table.

The "Traversal located on Section" relationship associates each traversal with the sections of road that comprise that traversal. For example, this relationship could be used to identify all of the intersections that occur along each traversal. The following preferred method describe how to implement a Traversal located on Section relationship:
1) Add the [traversal ASec table name].[traversal ID column name] column to the SELECT statement.
2) Add the [traversal ASec table name] to the FROM statement.
3) Include the [Traversal ASec table name].Begin_Pct and [Traversal ASec table name].End_Pct columns to the dynamic segmentation join portion of the query.

To include static Attributes from the Entity table for the traversal Entity class, include an Entity ID relationship between the Traversal ASec table and the Traversal table.

The "Traversal is primary traversal of Section" relationship, which is only supported if the Supports_Primary_Ind flag is true, associates each section of road with a unique traversal in the traversal Entity class. For example, this relationship could be used to produce a report on the total number of road miles in a county, categorized by route type. The following preferred method describe how to implement a Traversal is primary traversal of Section relationship:
1) Add the [Traversal ASec table name].[traversal ID column name] column to the SELECT statement.
2) Add the [Traversal ASec table name] to the FROM statement.
3) Include the [Traversal ASec table name].Begin_Pct and [Traversal ASec table name].End_Pct columns to the dynamic segmentation join portion of the query.
4) Add the following to the WHERE clause of the SQL statement AND ([Traversal ASec table name].[Primary_Ind]=TRUE).

The "Intersection located on Section" relationship identifies the sections of road that are part of an intersection, and can be used to identify road properties associated with the intersections. For example, this relationship could be used to determine the number of road-miles that are include in intersections. The following preferred method describes how to implement an Intersection located on Section relationship:
1) Add the [Path table name].[Intersection ID column name] column to the SELECT statement
2) Add the [Path table name] and [Path ASec table name] to the FROM statement
3) Include the [Path ASec table name].Begin_Pct and [Path ASec table name].End_Pct columns to the dynamic segmentation join portion of the query.
4) Add the following to the WHERE clause of the SQL statement AND ([Path table name].[intersection ID column name]=[Path ASec table name].[intersection ID column name]).

The "Road Furniture located on Section" relationship identifies the sections of road on which Road Furniture Entities are located. For example, this relationship could be used to help determine the number of miles of road that are part of a bridge. The following preferred method describes how to implement the Road Furniture located on Section relationship:
1) Add the [Road Furniture ASec table name].[Entity ID column name] column to the SELECT statement.
2) Add the [Road Furniture ASec table name] to the FROM statement.
3) Include the [Road Furniture ASec table name].Begin_Pct and [Road Furniture ASec table name].End_Pct columns to the dynamic segmentation join portion of the query.

To include static Attributes from the Entity table for the Road Furniture Entity class, include an Entity ID relationship between the Road Furniture ASec table and the Road Furniture Entity table.

The "Section comprises Traversal" relationship identifies each traversal with the sections of road that make up that traversal. For example, this relationship could be used to list the traversals that include unpaved sections of road. The following preferred method describes how to implement the Road Furniture located on Section relationship:
1) Add the [Traversal ASec table name].[Road/Division ID name] column to the SELECT clause
2) Add the [Traversal ASec table name] to the FROM clause
3) Include the [Traversal ASec table name].Begin_Pct and [Traversal ASec table name].End_Pct columns to the dynamic segmentation join portion of the query.
4) Because the Section comprises Traversal relationship will result in many records for each traversal, include a SELECT DISTINCT or GROUP BY clause to eliminate this redundancy.

The "Traversal overlaps Traversal" relationship identifies traversals that overlap with another traversal. For example, this relationship could be used to list all of the alternate names that occur along a given traversal. The following preferred method describes how to implement the Traversal overlaps Traversal relationship. In this description, the term "primary traversal" refers to the traversal Entity class that is the primary Entity class for the query, and the term "join traversal" refers to the traversal Entity class that will be joined to the primary traversal.

1) Add the [join traversal ASec table name].[traversal ID name] column to the SELECT clause.
2) Add the [join traversal ASec table name] and [primary traversal ASec table name] in the FROM clause.
3) Include the [join traversal ASec table name].Begin_Pct, [join traversal ASec table name].End_Pct, [primary traversal ASec table name].Begin_Pct, and [primary traversal ASec table name].End_Pct columns to the dynamic segmentation join portion of the query.
4) If necessary, include the Entity ID relationship between the primary traversal ASec table and any other primary traversal tables included in the query.
5) Because the Traversal overlaps Traversal relationship will result in many records for each traversal, include a SELECT DISTINCT or GROUP BY clause to eliminate this redundancy.

The "Traversal intersects Traversal" relationship identifies the traversals that intersect a given traversal at an Intersection Entity. The following steps describe how to implement the Traversal intersects Traversal relationship. In this description, the term "primary traversal" refers to the traversal Entity class that is the primary Entity class for the query, and the term "join traversal" refers to the traversal Entity class that will be joined to the primary traversal. In an alternative embodiment, a table is added to the model just to support this relationship.

The "Intersection occurs on Traversal" relationship identifies the intersections that occur along a given traversal. The following preferred method describes how to implement the Traversal intersects Traversal relationship. It will be apparent to one skilled in the art that this method is to be modified the use the additional table mentioned above, for the alternative embodiment.

The following are the other Entity relationships that are built-in to the data model. It will be apparent to one of ordinary skill in the art how to develop the appropriate SQL statements for these relationships.

The "Road Furniture located on Traversal" relationship identifies road furniture Entities that are located on a traversal.

The "Section is part of Intersection" relationship identifies the sections of road that are part of an intersection.

The "Traversal intersects at Intersection" relationship identifies the traversals that intersect at each intersection.

The "Road Furniture is located at Intersection" relationship identifies the road furniture Entities that occur at an intersection.

The "Section is location of Road Furniture" relationship identifies the sections of road on which road furniture Entities are located.

The "Traversal is location of Road Furniture" relationship identifies the traversals on which road furniture Entities occur.

The "Road Furniture is co-located with Road Furniture" relationship identifies road furniture Entities that occur at the same location as other road furniture Entities.

The Relate table Entity relationships define relationships between Entities by defining the elements that must be added to a SQL statement in order to join the Entity tables of the related Entities. The following preferred method describe how to implement a relationship based on the Relate table. In this description, the term "to Entity class" refers to the primary Entity class in the query, and the term "from Entity class" refers to the Entity class that will be joined to the primary Entity class.

1) Add the [from Entity class table name] and [to Entity class table name] to the FROM clause
2) Add any additional relate table names to the FROM clause.
3) Add the string in the [Where Clause] column of the Relates table to the WHERE clause
4) Consider the value of the [Join Type] column in the Relates table; if the join type indicates a many-to-any join, A GROUP BY or SELECT DISTINCT clause may have to be added to the SQL statement to eliminate the redundancy that might be introduced by this join. The term "many-to-any" is used when a many-to-one or many-to-many relationship is appropriate, as would be apparent to one of ordinary skill in the art.

The first two steps in defining a query are (1) identifying the primary Entity class and (2) defining the type of query result that will be produced. The first step can be accomplished either by (a) selecting an Entity class from the Data Dictionary or (b) selecting an initial Attribute, in which case the primary Entity class is assumed to be the Entity class that is the parent of the selected Attribute. The types of query results that can be produced depend on the Entity class type of the primary Entity class; see Table 1 for an example of some of the types of queries.

TABLE 1

Examples of Types of Queries

| Entity Class Type | Type of Query |
| --- | --- |
| All Entity classes | A list query that lists selected Entities in an Entity class |
| All Entity classes | A count query that counts selected Entities in an Entity class |
| Linear Entity classes | A count density query that counts selected Entities that occur along a linear Entity and weights the results according the length of the linear Entity |
| Linear Entity classes | A mileage query that reports the number of road-, division-, or lane-miles |
| Linear Entity classes | A sub-section query that lists selected sub-sections of selected Entities in an Entity class |

In this table, the first two types of queries apply to any primary Entity class. The second three types of queries apply to the following primary Entity classes: Road Sections, Division Sections, Road RCLinks, Division RCLinks, Road Intersections, Division Intersections, Road Traversals, Division Traversals, and any Road Furniture Entity classes with a linear geometry.

For example, a list query, as shown in Table 1, generates a list of Entities along with Attributes of those Entities (or related Entities). The result set is a table that includes (a) a column for the Entity ID of the selected Entities and (b) a column for each selected Attribute. 1

The Entity-Attribute structure of the data implies that there are two basic types of queries: (1) queries that select a collection of Entities and report Attributes of those Entities; and (2) queries like (1) that then group the Entities and generate summary statistics. An example of the first kind of query is a query to support mapping (e.g., generate a list of all of the accident site locations on a specified road). An example of the second kind is a query to report road-miles (e.g., generate a list of the number of road-miles in each county). This very general classification can be broken down further to identify more detailed query classifications. For example, there are three types of mapping queries: (1) a query whose result includes the shape column to be mapped, (2) a query whose result includes a pointer to the shape column to be mapped, and (3) a query whose result includes a Road/Division Section ID and offsets along that section that is rendered on-the-fly.

The Location Referencing Model

One feature of the system and method is the relationship between data and the location of that data, which allows maps to be produced that depict the spatial distribution of data and to process queries that rely on the fact that data is co-located. A characteristic of processing location-based queries is the ability for a user to specify a location of interest. For example, a user may want a list of all of the RCLinks in a particular county; in this case, the location of interest is the county. Alternately, a user may want to identify the location of an accident, in which case the location of interest is the accident site, which may be specified by RCLink and milepost. Because the exemplary embodiment is a road network based system, these locations are generally limited to specifying positions on the road network. The Location Referencing Model describes how the user can specify road locations within the system. In particular, this model addresses the following methods for specifying a location:

RCLink. An RCLink is the standard method that GDOT currently uses to identify a location in which a RCLink name and milepoint offset along that RCLink specifies a road location.

Traversal. A Traversal is a generic method for supporting street names and milepoint offsets along the streets. RCLink is a special case of a traversal, but other classes of traversal (e.g., street names, interstate numbers) are possible.

Milepost. Milepost locations provide an alternative other than milepoints for specifying offsets along traversals.

Address. Address ranges provide an alternative other than milepoints for specifying offsets along traversals.

Relative References. Relative references provide a method for specifying a location relative to a known location. Mileposts are a special case of a relative reference.

Area Reference. An Area Reference refers typically to a jurisdictional area.

Road Attributes are maintained for several types of jurisdictional areas identifying the jurisdictional area in which a road lies (e.g., for counties, for maintenance districts). These jurisdictional road Attributes can be used to identify locations.

Geographic Reference. A Geographic Reference refers to a map reference. For instance, in the map interface, users can identify locations by clicking on points or selecting rectangular regions of the map. These geographic references are resolved into road locations by selecting either the closest road position for a point reference or the set of road sections contained inside the rectangle for a rectangular reference.

In the exemplary system, all road locations are expressed internally as either Road Sections with offsets or as Division Sections with offsets. Thus, a location referencing method is a definition of how to convert between some reference data (e.g., RCLink name and milepoint) and a Road Section or Division Section and offset.

Figure 16:
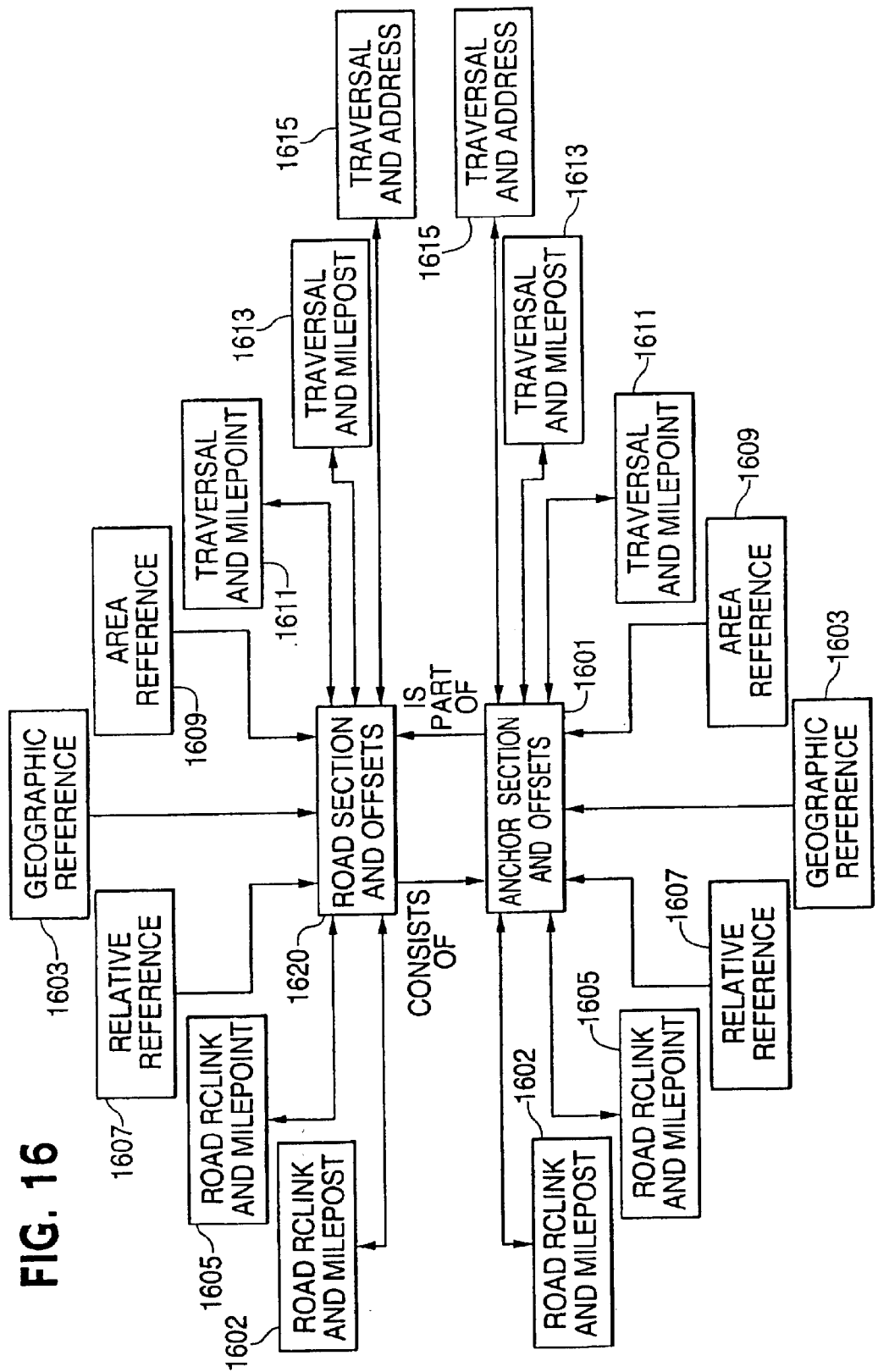
FIG. 16 is a block diagram showing different location referencing methods.

Referring now to FIG. 16, there is a depiction of the types of location reference conversions that are part of the data model. In this figure, two-headed arrows indicate that conversion both ways is supported between a location referencing method and the internal Anchor/Road Section location referencing method. A one headed arrow indicates that the conversion works only from a location reference to the internal location referencing method. For instance, Anchor Section and Offsets 1601 is connected with Road RCLink and Milepost 1602 with a two-headed arrow. Thus, conversion is supported both ways. Anchor Section and Offsets 1601 is connected with Geographic References 1603 via a one-headed arrow. Thus, conversion from a Geographic Reference to an Anchor Section and Offset is supported, but not vice-a-versa.

Specifically, those conversions that are supported in both directions are: Road RCLink and Milepost 1602 to/from Anchor Section and Offsets 1601 and Road Section and Offsets 1620; Road RCLink and Milepoint 1605 to/from Anchor Section and Offsets 1601 and Road Section and Offsets 1620; Traversal and Milepoint 1611 to/from Anchor Section and Offsets 1601 and Road Section and Offsets 1620; Traversl and Milepost 1613 to/from Anchor Section and Offsets 1601 and Road Section and Offsets 1620; and Traversal and Address to/from Anchor Section and Offsets 1601 and Road Section and Offsets 1620. Those conversions that are supported only in one direction are: Relative Reference 1607 to Anchor Section and Offsets 1601 and Road Section and Offsets 1620; Geographic Reference 1603 to Anchor Section and Offsets 1601 and Road Section and Offsets 1620; and Area Reference 1609 to Anchor Section and Offsets 1601 and Road Section and Offsets 1620. It will be apparent to one skilled in the art how to implement each of these conversions.

The Data Maintenance Model

The TSAF database is a complex structure that includes many interactions between the elements that comprise the database. For example, road Attributes are stored via dynamic segmentation related to percentage offsets along the Division Sections. Thus, any change to a Division Section has the potential to also affect every road Attribute stored along the Division Section. This dependency extends far beyond this single example: Road Sections depend on Division Sections, many maps depend on road Attributes, traversals depend on Division Sections, etc.

In addition to these direct data dependencies, the TSAF data maintenance practices must manage other indirect data dependencies. For example, road characteristic data is periodically re-surveyed by generating a pre-inventory report that documents an existing route and the road characteristic data along that route. A survey crew then validates and updates the data in the pre-inventory report, and imports the newly surveyed data back into the database. The system and method must protect against changes in the definition of the route between the time the pre-inventory report is generated and when the surveyed data is imported to prevent associating road characteristic data with the wrong section of road.

The data maintenance process uses three methods to manage this complexity and ensure consistency for all data maintenance activities:
1. session control and locking mechanisms are used that help manage all data maintenance activities.
2. Data Dictionary is used to obtain information about the dependencies between data elements and calls to data maintenance objects (see the next item) to process any data changes, including those caused indirectly by dependencies between data elements.
3. a collection of data maintenance objects is implemented, each of which provides data maintenance services for a particular type of data.

The Data Dictionary Model

The system and method are designed to provide a powerful and extensible system for storing data. In order to provide this extensibility, meta-data is maintained about most Entities and Attributes that define these Entities and Attributes to the exemplary embodiment software components. Thus, some new Entities and Attributes can be supported simply by adding new meta-data describing the new Entities and Attributes; software modifications may not be required. For example, one could add a new Division Section Attribute defining the surface type of the shoulder by providing the meta-data that describes this new Attribute. This meta-data is stored in the Data Dictionary, which is described herein.

It should be noted that the Data Dictionary is merely a repository for the properties that are defined elsewhere in this document. For example, Entity classes are characterized by properties and this definition is implemented in the Data Dictionary via an Entity Class table that lists the Entity classes and the properties of each Entity class. Thus, the definition of the Data Dictionary consists of two parts: (1) a table structure used to store and relate Data Dictionary information and (2) a list of the columns in each table and the associated properties (defined elsewhere in this document) which the column describes.

Because the Data Dictionary is a complicated object, the description of it is divided up into a series of sub-dictionaries, each documented in a separate sub-section below.

The Entities-Attributes Data Dictionary

Figure 17:
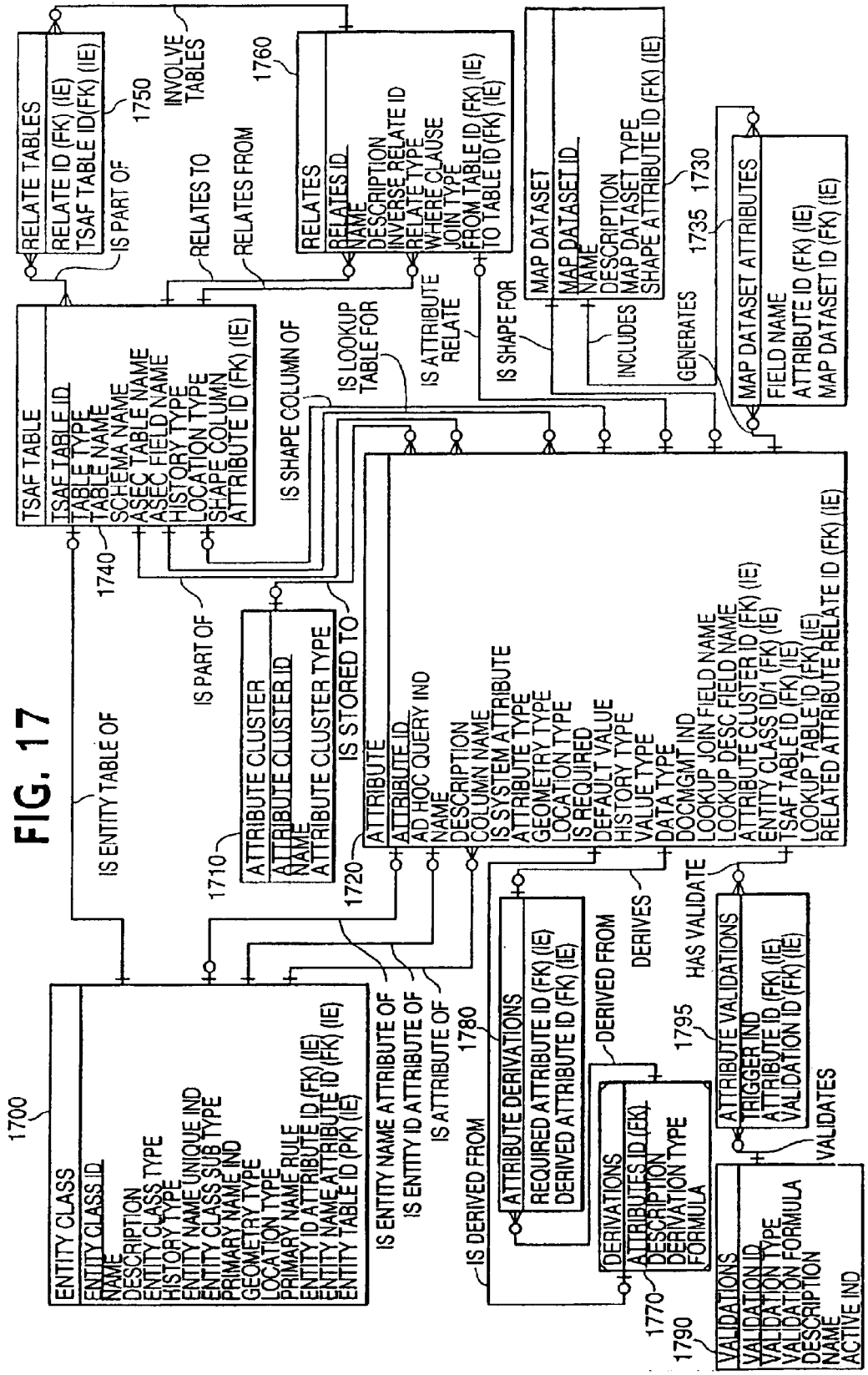
FIG. 17 is a diagram showing a data dictionary for entities and attributes, in accordance with the system and method.

The Entities-Attributes portion of the Data Dictionary describes the portion of the Data Dictionary that defines the meta-data necessary for the Entities and Attributes. The table structure is depicted in FIG. 17, and the column definitions follow:

Entity Class ([Entity_Classes]) (1700). Each row of the Entity Class table defines an Entity class by listing values for the following columns.

Description ([Descr]). This is an optional description of the Entity class, which is used in user interface screens to help a user better understand the objects that an Entity class represents.

Entity Class ID ([Entity_Class_ID ]). Each Entity class is identified by a unique numeric ID, the Entity Class ID. This ID, along with the Entity ID, forms part of the Global Entity Identifier. This value is static once an Entity class is created and cannot be modified by a user.

Entity Class Type ([Entity_Class_Typ_Cd]). Each Entity class belongs to an Entity class type that defines the general characteristics of that Entity class.

The Entity class type column contains a numeric code indicating the Entity class type for this Entity class.

Entity Class Sub-type ([Entity_Class_Sub_Typ_Cd]). The Entity class type is not always sufficient to characterize the major characteristics of an Entity class, in which case the Entity class subtype completes the characterization.

Entity ID Attribute ID ([Attribute_ID]). This is the Attribute ID of the Attribute for the Entity ID column in the Entity table.

Entity Name Attribute ID ([Attribute_ID_Entity_Name_Col]). This is the Attribute ID of the Attribute, if any, for the Entity name column in the Entity table.

Entity Table ID ([Application_Table_ID]). This is the Table ID for the Entity table, which relates a row in the Entity Class table with the row in the Application Table defining meta-data about the Entity table.

Geometry Type ([Geometry_Typ_Cd]). This indicates the type of geometric shape that is associated with an Entity class.

History Type ([History_Typ_Cd]). This indicates the method used to maintain historical data for this Entity class.

Location Type ([Location_Typ_Cd]). For an Entity in the Road Furniture Entity Class, this indicates whether the location for the object refers to the full width of the road or to a position on the road.

Name ([Name]). Each Entity class has a name, unique among the Entity class names, that is used in user interface screens to help a user find and select data. This column is the Entity class name.

Some traversal classes (e.g., RCLinks) supply names for each section of road, and others (e.g., interstates) only supply names for some sections of roads. A flag indicates whether a traversal Entity class is intended to supply names for all sections of the road network. Some traversals require that the names of the traversals are unique (e.g., RCLinks). Others allow traversals with the same name (e.g., streets). A column indicates whether the traversal names for this traversal Entity class are unique. Some Traversal Entity classes support assigning a primary traversal to each section of road, and a column indicates whether the traversal class supports that functionality.

In order to assign a primary traversal to each section of road, a business rule must be defined that indicates which of the traversals assigned to a section of road is the primary traversal. A column defines a function that, when applied to a table containing the current Attributes for a traversal, returns a key that can be used to sort the traversals in order of importance. For each section of road, the traversal with the least key among the traversals that include that section is the primary traversal for that section.

Some traversal classes can support milepost values that apply specifically to that class of traversals. A column indicates whether the traversal class has milepost values associated specifically to it. Some Entity classes are not appropriate for viewing in with the AdHoc Query tool. A flag indicates whether an Entity class should appear in the AdHoc Query tool.

A user with System Privileges can create, update, and delete entries from the Entity Class table in order to create, update, and delete Entity classes. When modifying an Entity, the user is responsible for ensuring that the Oracle® tables required to maintain information about the Entity are also modified.

An Attribute 1720 defines a characteristic of an Entity. The following list defines the properties of an Attribute:

Application Table ID ([Application_Table_ID]). The ID of the Application Table, as shown in the Table 1740, describes the table in which this Attribute is stored.

Attribute Cluster ID ([Attribute_Cluster_ID]). The Attribute Cluster ID specifies the Attribute cluster, if any, to which this Attribute is associated.

Attribute ID ([Attribute_ID]). Each Attribute is identified by a unique numeric identifier, the Attribute ID.

Attribute Type ([Attribute_Typ_Cd]). Most Attributes are directly related to columns in the TSAF database and are maintained by directly updating the value in that column. However, some Attributes are derived from other Attribute values. For example, an IsPaved Attribute could be derived from the pavement type Attribute by coding each pavement type as either paved or unpaved.

Column Name ([Physical Field Name]). The name of the column in the Application Table, if any, that contains the values for this Attribute.

Data Type ([DB_Data_Type]). This property indicates which of the underlying data types applies to this Attribute.

Default Value ([Default Value]). For a required Attribute, this column specifies the default value that is used for the Attribute if no value is specified when the Entity for that Attribute is defined.

Description ([Descr]). A description of the Attribute.

Entity Class ID ([Entity_Class_ID]). The Entity Class ID specifies the Entity class to which this Attribute is associated.

Geometry Type ([Attr_Geometry_Typ_Cd]). Most Attributes of Division Sections and Road Sections are dynamic segmentation Attributes, which might be either point or linear events. Most Attributes of other Entity classes are simple values (i.e., not dynamic segmentation values). This property determines the type of dynamic segmentation that applies to an Attribute.

History Type ([History_Typ_Cd]). A continuous historical archive of most data is automatically maintained. However, a historical archive may not be required for some Attributes. This column indicates the type of historical data that should be maintained for this Attribute. This value must be consistent with the History Type value of the related Entity. The History Type value of the table used to store the Attribute values of this Attribute must also have a history type that is consistent with this History Type.

Location Type ([Attr_Location_Typ_Cd]). Dynamic segmentation allows the system to reference linear sub-sections along a Road or Division Section. However, some Attributes may refer to locations that are either sub-sections across a Road or Division Section or a position on a Road or Division Section. For example, a county line may run down the middle of a road, and half of the road should lie in each county. The location type property indicates which of the types of dynamic segmentation location apply to an Attribute.

Lookup Table ID ([Application_Table_ID_Lookup]). Some Attribute values are specified as codes pointing into a lookup table that contains a description for each code. The Lookup Table ID column is either Null if this Attribute does not have a related lookup table, or is the Application Table ID value for the related lookup table.

Lookup Table Join Field ([Lookup_Join_Field_Name]). A lookup table for an Attribute is implemented by a relationship between the Attribute and a column in the lookup table. This property specifies the name of the column in the lookup table used in this join.

Lookup Table Name Field ([Lookup_Descr_Field_Name]). A lookup table provides a list of allowed values for an Attribute and a name for each of those allowed values. This column specifies the name of the column in the lookup table that contains the names of the allowed values.

Name ([Name]). Each Attribute is identified by a name, which must be unique among the Attributes and Attribute clusters associated with an Entity class.

Required ([Required_Ind]). Because most Attributes are stored in Attribute tables that are related to an Entity table, it is possible to represent null values of an Attribute by omitting the row in the Attribute table that would define the value of that Attribute. Omitting rows in this manner changes the way in which an Attribute must be queried. This property indicates whether a value is required (i.e., a row exists to support values) for this Attribute.

System Attribute ([System_Attribute_Ind]). Indicates whether an Attribute is a system Attribute, in which case the user cannot modify the meta-data describing this Attribute. Also, special routines are often required to generate results for system Attributes.

Value Type ([Value_Typ_Cd]). Most Attributes are single-valued. For example, each position of a road has an identifiable type of pavement, so the pavement type Attribute is single-valued. Some Attributes, however, can have multiple values. For example, a barrier type Attribute of a road would have multiple values if a road included both a guard rail and a sound barrier on one side of the road. The value of this property specifies whether an Attribute is single- or multi-valued.

Visible To AdHoc Query ([AdHoc_Query_Visible_Ind]). A component is included to help generate ad hoc queries, and some Attributes are available in the ad hoc query component and some are not. This column indicates whether an Attribute is available for inclusion in an ad hoc query.

Visible To Document Mgmt ([Document_Mgmt_Visible_Ind]). A document management component is included that allows documents to be associated with other Entities. This column indicates whether the Attribute is available to the document management component.

An Attribute Cluster 1710 defines a group of related Attributes. For example, all of the road characteristics related to pavement could be joined together into a pavement data Attribute cluster. For single-valued Attributes, the Attribute cluster only defines a logical grouping. For multi-valued Attributes, the Attribute Cluster also defines a physical grouping where all of the Attributes in the cluster are stored in the same Application Table.

Attribute Cluster ID ([Attribute_Cluster_ID]). Each Attribute cluster is identified by a unique numeric identifier, the Attribute Cluster ID.

Attribute Cluster Type ([Attribute_Cluster_Typ_Cd]). Some Attribute clusters simply define logical organizations, while others specify the physical storage of the Attributes. This property specifies whether an Attribute cluster defines a logical or physical grouping of the Attributes.

Name ([Name]). Each Attribute cluster is also identified by a name, which must be unique among the Attribute and Attribute clusters associated with a particular Entity class.

The Application Table 1740 defines the Oracle® tables that contain Entity or Attribute data for the exemplary embodiment. This information is primarily used by (a) the data maintenance component in order to determine the tables that must be updated during data maintenance activities and (b) the ad hoc query component in order to identify the tables that must be included in a query and the relationships between these tables. The following list describes the columns in this table:

Application Table ID ([Application_Table_ID]). Each Application Table is identified by a unique numeric identifier, the Application Table ID.

Description ([Descr]). This column contains a description of the table.

DSec Table Name ([Application_Table_IDDynseg_Tbl]). Some tables (e.g., a Road Furniture Entity table) require a related DSec table that defines a dynamic segmentation relationship between the table and the Division Section (or Road Section) table. This column indicates the name, if any, of this dynamic segmentation name. The standard name for a dynamic segmentation table is the Table Name with "_DSec" appended at the end for A Division Section based table and "_Rsec" appended at the end for a Road Section based table.

DynSeg Field Name ([DynSeg_ID_Field_Name]). When a table requires a supporting dynamic segmentation table, a section ID column is the join field between the dynamic segmentation table and the Anchor/Road Section table. A section ID column is also used when a table is itself a dynamic segmentation table (i.e., an Attribute Event table). This column indicates the name, if any, of the section ID column. For Division Section based dynamic segmentation tables, the standard name is "Division ID". For Road Section based dynamic segmentation tables, the standard name is "Road ID".

History Type ([History_Typ_Cd]). TSAF maintains a running history of TSAF data by including a Begin Dt and End Dte column in the tables for which historical information is maintained. This column indicates the type of historical data that is maintained in this table.

Location Type ([Location_Typ_Cd]). Tables that use dynamic segmentation to identify a road location can be used for three types of locations: a road location, a half-road location, or a road-side location. This column indicates that type of road location, if any, used for this table.

Schema Name ([DB_Schema_Name]). The name of the Oracle® schema in which this table is located.

Shape Column Name. Some tables include a shape column, in which case they can be rendered by the TSAF mapping component. The Shape Column Name indicates the name, if any, of the shape column in the table.

Table Name ([Table_Name]). The name of the Oracle® table associated with this Application Table.

Table Type ([Table_Typ_Cd]). Each Application Table is characterized by a table type, which determines how that table relates to other Application Tables. This column specifies the table type for a Application Table.

Most of the relationships between Application Tables are defined directly by the type of the table. For example, an Attribute Event table is a dynamic segmentation table that is related to either a Division Section or a Road Section table by section ID, and an Attribute table is related to an Entity table by Entity ID. In some cases, however, a non-standard relationship exists. For example, BIMS tables are related to the TSAF Entity table that contains bridge information, though the TSAF Entity ID is not the key in this relationship. Similarly, the county road characteristic can be used to relate the road network to the county Attribute table, so that each section of road "inherits" a county name Attribute. The Relates table 1760 includes the following columns to contain information about these non-standard relationships:

Description ([Descr]). The optional description of a relationship can be used to help clarify to users the meaning of a relationship.

From Table ID ([Application_Table_ID]). Each relationship consists of (a) a join criteria relating tables, (b) a table that is the "source" of the join, (c) a table that is the "destination" of the join, and (d) intermediate tables that are required by the join. This column indicates the source table of the join.

Inverse Relate ID. Some relationships between tables should only be used in one direction, while others are bi-directional. For example, the road-to-county relationship "is in county" could also be used as a county-to-road relationship "contains roads". This column lists the relate ID of the relationship, if any, that is the inverse of the given relationship.

Relate Join Type. The type of join between tables is important in order when generating SQL statements to query the data. For example, a query to count accidents can simply use a Count( ) SQL command if all of the joins in the query are one-to-one, but must use a "group by" clause if not. The value of this column indicates the type of join created by a Relate.

Name ([Name]). Each entry in the Relates table has a name that is used to help users select a relationship of interest. Because this name will be used in pick lists to help users select related Entities that are part of a query, a name that will make sense in this context should be selected. For example, the relate between a road and the county that contains that road could be named "is in county". The Name must be unique among the names that relate two specific Entity classes.

Relate ID ([App_Table_Relate_ID]). Each entry in the Relates table has a unique numeric ID, the Relate ID, that is used in to identify that relationship.

To Table ID ([Application_Table_ID_To]). Each relationship consists of (a) a join criteria relating tables, (b) a table that is the "source" of the join, (c) a table that is the "destination" of the join, and (d) intermediate tables that are required by the join. This column indicates the destination table of the join.

Where Clause ([Where_Clause]). Each relationship in the Relates table is defined by (a) the tables that form part of the relationship, which become part of the FROM clause of an SQL statement and (b) the join criteria relating the tables, which becomes part of the WHERE clause. This column contains the phrase that becomes part of the where clause.

The Relates table 1760 defines relationships between Application Tables 1740 via the Relates Tables table 1750. Each relationship consists of (a) a join criteria relating tables, (b) a table that is the "source" of the join, (c) a table that is the "destination" of the join, and (d) intermediate tables that are required by the join. This column indicates the destination table of the join. The first three criteria are specified by the Where Clause, From Table ID, and To Table ID columns of the Relates table. This information is sufficient to defined relationships that only involve the two primary tables. However, some relationships will involve some intermediate tables. For example, the relationship between the Division Section Entity and the County Entity requires the Attribute Event table containing the county code as an intermediate table. The Relate Tables table 1750 lists the intermediate tables, if any, required to support a relationship, and includes the following columns:

Relate ID ([App_Table_Relate_ID]). Each entry in the Relate Tables table 1750 defines an intermediate table of a relationship. This column is the ID of the relationship.

Application Table ID ([Application_Table_ID]). Each entry in the Relate Tables table 1750 defines an intermediate table of a relationship. This column is the ID of the intermediate table.

Most Attribute values are directly related to a column in an Attribute table and the value in this column is entered and maintained directly. However, some Attribute values are derived from the values of other Attributes. For example, a Paved Attribute could be derived from a Pavement Type Attribute. The Derivations table 1770 provides the formula used to derive an Attribute value.

Attribute ID. Each derivation is used to generate the values of a derived Attribute. The Attribute ID is the ID of this derived Attribute and also serves as a unique ID for this derivation.

Derivation Type. A derived Attribute can either be derived on-the-fly during a query or instantiated as a column in an Attribute table. This column indicates which of these types of derived Attributes applies to this entry.

Description. This column contains an optional description of a derivation.

Formula. Each derivation consists of two parts: (1) a collection of Attributes that are used to derive a value and (2) the formula that uses those Attribute values to generate a derived value. This column contains the formula used to generate a derived value.

In an alternative embodiment, each entry in the Derivations table 1170 defines how to calculate the value of a derived Attribute, a calculation that involves other Attribute values. The entries in the Attribute Derivations table 1780 list the Attributes required by each calculation in the Derivations table 1770. The required Attributes, in turn, are used during data maintenance to (a) identify when a derived, instantiated Attribute must be updated (because one of the Attributes required by a derivation was changed) and (b) generate the SQL statement that accumulates all of the Attribute values together in order to compute a derived value. This table consists of the following two columns.

Derived Attribute ID. Each entry in this table lists an Attribute that is required for a derivation, and the derivation is identified by the Attribute ID of the Attribute that is being derived. This column lists the ID of the derived Attribute.

Required Attribute ID. Each entry in this table lists an Attribute that is required for a derivation. This column lists the ID of a required Attribute.

A validation is a check on an Attribute value that should be implemented before changes to an Attribute value are allowed. Some validations (e.g., a value for an Attribute with a lookup table must come from the list of values in that lookup table) are built-in to the data model and are not listed in the Attribute Validations table 1795. Those validations that are not built-in to the data model (e.g., the median-type of an undivided road must be "none") are specified in this table.

Active ([Active_Ind]). Validations may be temporarily deactivated by setting this Boolean value to False.

Description ([Descr]). Each validation may have an optional description, which describe the validation.

Name ([Name]). In order to facilitate user definition of the validations, each validation is assigned a name, which must be unique among the validations. These names are used in reports and user interfaces that list failed data updates and the reasons for the failure. This column contains the validation name.

Validation Formula ([Formula]). Each validation is implemented as a formula that computes a value of True if a validation is satisfied and a value of False if a validation fails. This column contains the validation formula.

Validation ID ([Validation_ID]). Each validation is identified by a unique numeric identifier, the Validation ID.

Validation Type ([Validation_Typ_Cd]). Failure of a validation may result in a variety of responses (e.g., abort a data update, confirm an update before proceeding). The validation type specifies what happens if a validation fails.

Attribute values can be validated by cross-checking different Attribute values. Each validation consists of (a) a formula used to perform the validation and (b) a list of Attributes whose values are required by the formula. This table is a join table that indicates the Attributes required by a validation formula.

Attribute ID ([Attribute_ID]). Each validation consists of the Attributes required for the validation and the validation formula. The Attribute ID identifies a required Attribute for a validation.

Triggers Validation ([Trigger_Ind]). Some validations that are involved in a validation should not trigger a validation if the value of that Attribute changes. The Trigger Ind indicates whether a change in the value of the Attribute specified by the Attribute ID should trigger a validation.

Validation ID ([Validation_ID]). Each validation consists of the Attributes required for the validation and the validation formula. The validation ID identifies the row in the Validations table that contains the validation formula.

One advantage of the present system and method over the prior art is the ability to generate maps that are based on the data in the database. In many cases (e.g., accidents), the maps are generated directly from the data tables themselves. In other cases, however, the maps are generated from data that is derived from the data tables. For example, "turbo layers" are used in order to render maps more quickly, and a turbo layer is derived from the underlying mappable data through geographical unions of shapes in the underlying map data. Also, maps that are related to data that exist in more than one Application Table must rely on a derived data table. The Map Dataset table 1730 describes each of the mappable datasets. It contains the following columns:

Description. The Description is an optional column that describes the map dataset.

Map Dataset ID. Each map dataset has a unique numeric identifier, the Map Dataset ID.

Map Dataset Type. TSAF uses several different types of map datasets. The simplest type of map dataset is simply an Application Table that already includes a spatial column. The Map Dataset Type specifies the type of dataset defined by a row in the Map Dataset table.

Name. Each map dataset has a unique Name that can be used to identify the dataset.

Query. Some map datasets rely on a query to generate from other Application Tables the data for the map dataset. If necessary, the Query column specifies this query.

Each map dataset consists of (a) information that describes the spatial data that should be rendered for the map and (b) other data columns that are part of the map data. The Map Dataset Attributes table 1735 lists the Attributes that are part of the map data that defines a map.

Attribute ID. Each row in this table lists an Attribute, indicated by the Attribute ID, that is part of a map dataset.

Field Name. Some map datasets may choose to use a different name for the column containing an Attribute than the standard column name. For example, a map dataset that includes data from more than one Application Table may include columns with the same name from different tables. However, the field names in the resulting map dataset must be unique. This column specifies the field name for an Attribute that is included in a map dataset.

Map Dataset ID. Each row in this table lists an Attribute that is part of the map dataset indicated by the Map Dataset ID.

The Data Maintenance Data Dictionary

Figure 18:
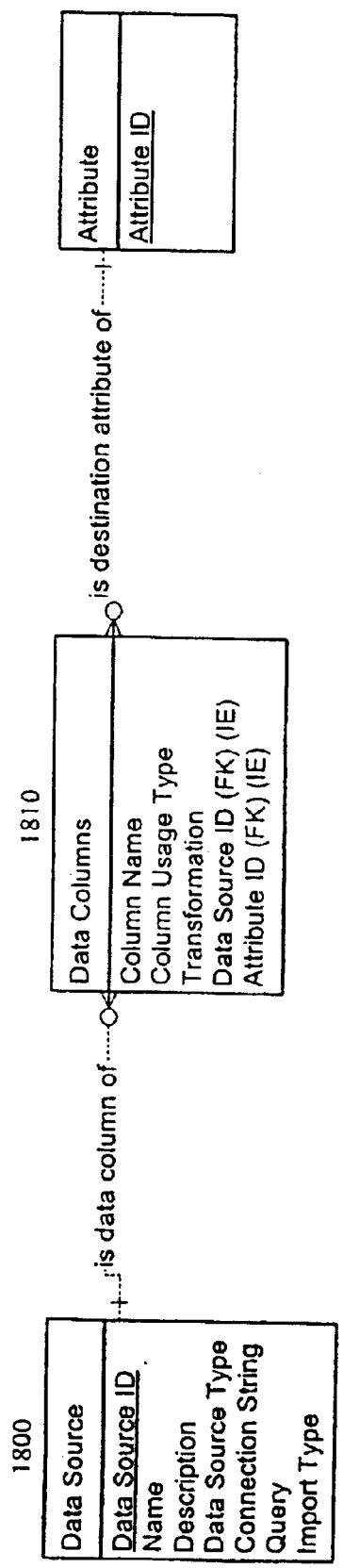
FIG. 18 is a diagram showing a data maintenance data dictionary table structure, in accordance with the system and method.

The data maintenance portion of the Data Dictionary describes the meta-data necessary to support the identification of data sources for the Entities and Attributes. For example, project data may be derived by periodically importing information from a project database. The Data Maintenance Data Dictionary contains information to identify (a) the source database that is used to populate data and (b) the relationship between the external data and Attributes. FIG. 18 depicts the table structure of the tables required to support this functionality.

The following sections describe each of these tables:

Data Source ([Data_Sources]) (1800). Updating data from an external data source consists of the following steps: (1) establish a connection to the data source, (2) query the data source to create an update recordset, and (3) use the data in the update recordset to update the data. The Data Source, which includes the following columns, contains the information necessary to establish a connection to the data source and to query that source.

Connection String. The connection string contains the information necessary to connect to a data source.

Data Source ID. Each data source is identified by a unique numeric identifier, the Data Source ID.

Data Source Type. TSAF must use different methods to connect to a data source, depending on the type of source. For example, different techniques are required to open a shape file than are required to open an Oracle table.

Description. Each data source has a description that provides a detailed description of the data source.

Import Type. Several different types of import are supported. The Import Type column specifies the type of import for this data source.

Name. Each data source has a name, which is used to help usersselect a data source for importing.

Query. The query column is an SQL statement that generates the import recordset from the data source.

Data Columns (1810). Updating data from an external data source consists of the following steps: (1) establish a connection to the data source, (2) query the data source to create an update recordset, and (3) use the data in the update recordset to update the data. The Data Columns table identifies the relationship between the external data columns and the internal Attributes so that those Attributes can be updated.

Attribute ID. Each column in the data source is used to affect an Attribute. The Attribute ID column identifies this Attribute.

Column Name. Each data column is identified within the source by the name of the data column.

Column Usage Type. External data can be used to populate an Attribute, to validate the value of an Attribute, or for some other purpose. This column specifies how an external column is used during an import from a data source.

Data Source ID. Each data column is associated with a data source, which is identified by the Data Source ID.

Transformation. In some cases, the format of the data in the data source is different from that in the present system. For example, the division data in the legacy RCData file is alphabetic, and the code in the system database is numeric. The transformation column contains a formula that transforms a value from the external format to the internal, system format.

The Map Data Dictionary

The map portion of the Data Dictionary describes the portion of the Data Dictionary that supports the meta-data necessary for maintaining and rendering maps.

The Session Data

One feature that helps support data maintenance activities is session control, which tracks the user and software component that is responsible for each modification to data. This task is accomplished by associating a session to each data maintenance activity. For example, if a user begins uploading RCData, a session is created to track the data changes that occur because of that activity. Each session tracks (a) the Attributes that a user may have revised during the session and (b) the Entities whose Attributes may have been modified. By cross-referencing the Attributes and Entities that may have been affected with the birth and end date information maintained for the historical archive, the specific data changes that occur during a session can be identified. In the rare instance that two or more users at the same time review the same Attributes of an Entity but make different changes, the user responsible for each change will not be identified, but will only identify that each user made changes. This session control information is stored in the Session Data.

Figure 19:
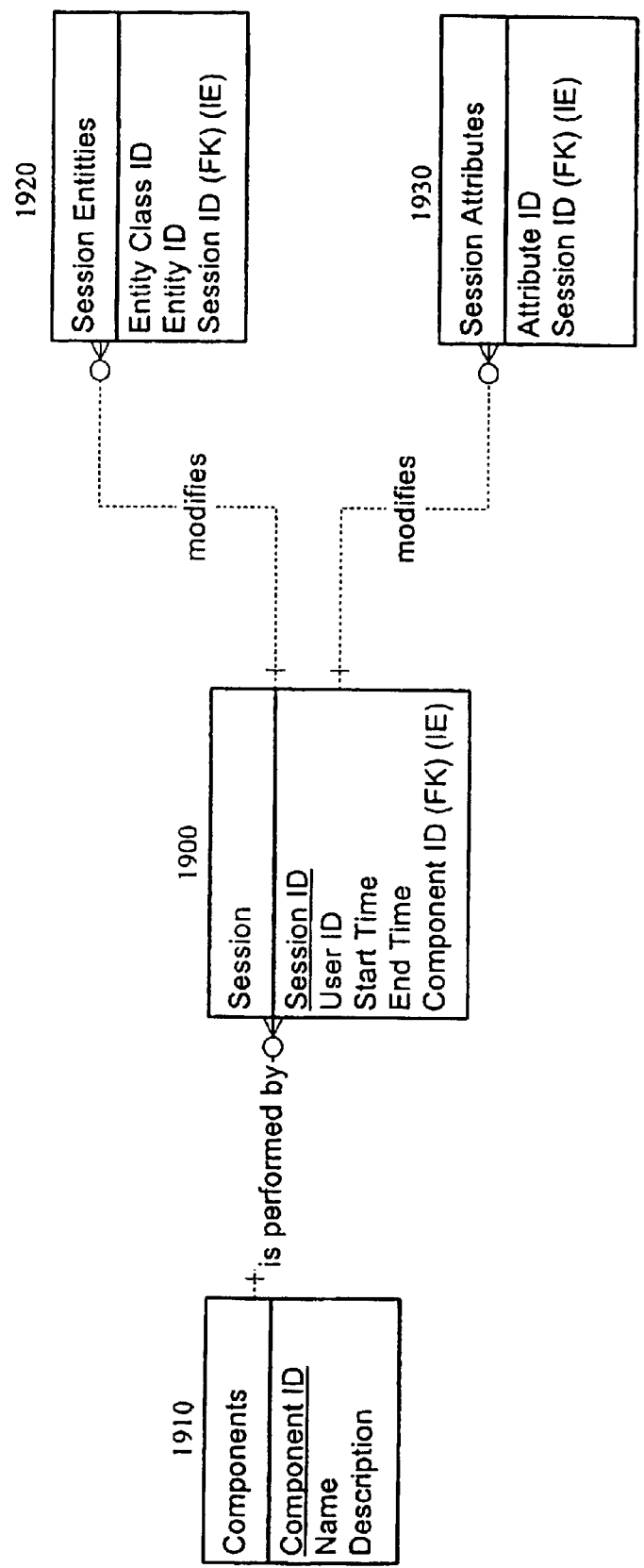
FIG. 19 is a diagram showing a session data table structure, in accordance with the system and method.

Referring to FIG. 19, there is shown the Session Data Tables: Components 1910, Session 1900, Session Entities 1920 and Session Attributes 1930, and relationships among them. The relationships between these tables are described below:

Session is performed by Components. Each session 1900 is related to a specific component 1910 that initiated that session and is responsible for the data maintenance activities that occurred during that session. This relationship identifies the component that initiated a session.

Session modifies Session Entities. Each session 1900 updates the data for a set of Entities 1920. This relationship identifies the Entities 1920 that were modified during a session 1900.

Session modifies Session Attributes. Each session 1900 involves the modification of certain Attributes 1930 of an Entity. This relationship identifies the Attributes that the user may have modified during a session.

The user is identified and the component responsible for each update to data by creating a session to track each data maintenance activity. The Session table 1900 stores information about each session.

Session ID ([Session_ID]). Each session is identified by a unique, numeric session ID, the Session ID User ID ([User_ID]). Each session is associated with the data maintenance activities of a particular user. The User ID is the identifier for that user.

Component ID ([Component_ID]). Each session is associated with the data maintenance activities that are initiated by a particular software component. The component ID is the identifier for that component.

Start Time ([Start_Time]). Each session occurs during a fixed period of time. The start time is the date and time at which a session began.

End Time ([End_Time]). Each session occurs during a fixed period of time. The end time is the date and time at which a session ended.

The software component that is responsible for changes to TSAF data is tracked. The Components table 1910 contains the list of software components that can be associated with a session, as described below:

Component ID ([Component_ID]). Each component is identified by a unique, numeric identifier, the Component ID.

Name ([Descr]). Each component is identified by a name.

Description. This column contains a description of a component.

Each session tracks the Entities whose data were altered by that session. This information is recorded in the Session Entities table 1920, as described below:

Session ID ([Session_ID]). Each row in the Session Entities table identifies an Entity whose data was altered by activities related to that session. The Session ID identifies the session.

Entity Class ID ([Entity_Class_ID ]). Each row in the Session Entities table identifies an Entity whose data was altered by activities related to that session. Each Entity is identified by a global Entity identifier, which consists of the Entity Class ID and the Entity ID.

Entity ID ([Entity_ID]). Each row in the Session Entities table identifies an Entity whose data was altered by activities related to that session. Each Entity is identified by a global Entity identifier, which consists of the Entity Class ID and the Entity ID.

Each session tracks the Attributes that might be altered during that session. This information is recorded in the Session Attributes table 1930, as described below:

Session ID ([Session_ID]). Each row in the Session Attributes table identifies an Attribute whose data was available for modification during a session. The session ID identifies that session.

Attribute ID ([Attribute_ID]). Each row in the Session Attributes table identifies an Attribute whose data was available for modification during a session. The Attribute ID identifies that Attribute.

The Lock Data

Figure 20:
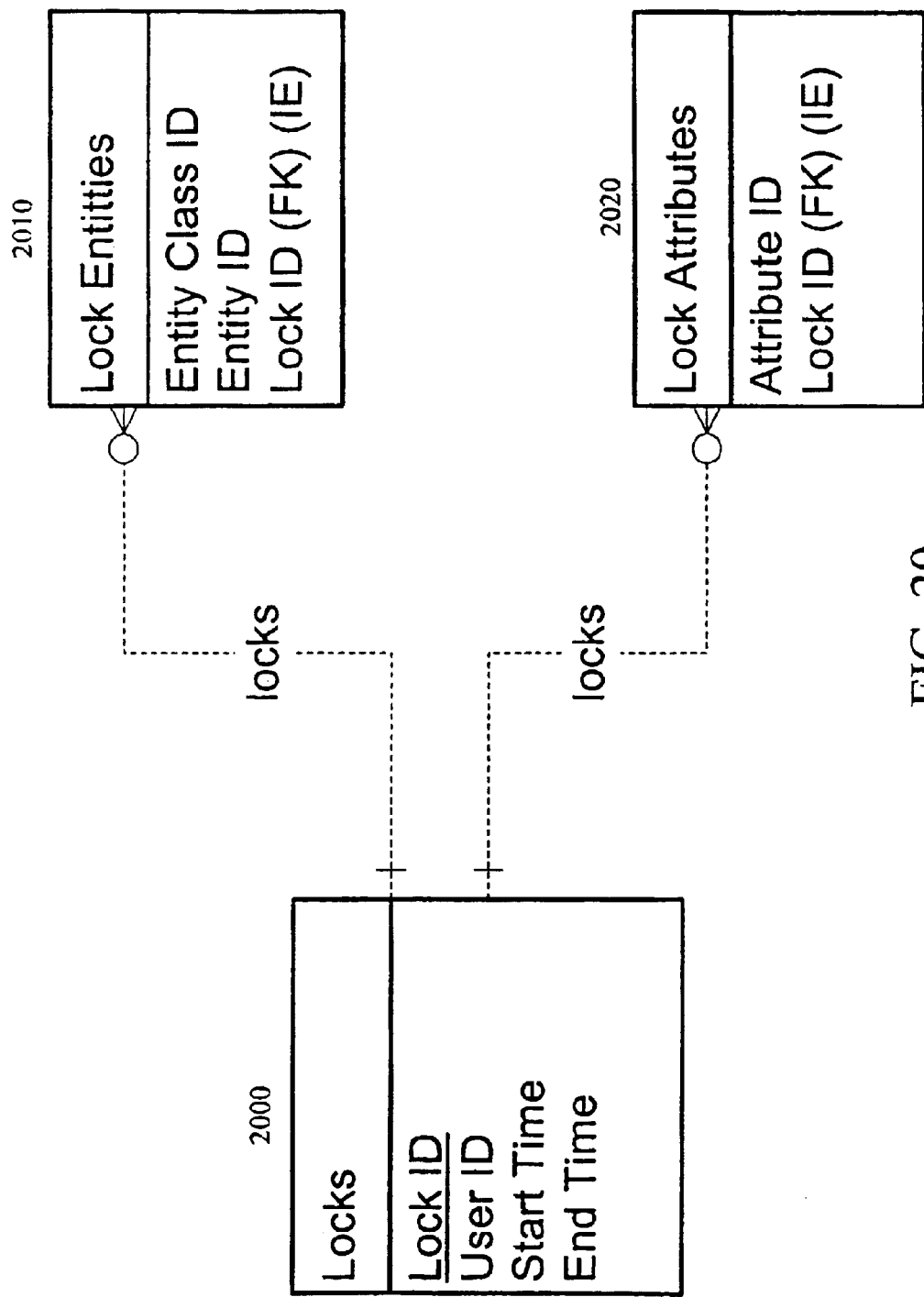
FIG. 20 is a diagram showing a locks data table structure, in accordance with the system and method.

One of the features that helps support data maintenance activities is data locking, which prevents other users from modifying data if a user has checked out the data in order to perform off-line data maintenance. This task is accomplished by creating a data lock, associating specific Entities and Attributes with the lock, and preventing other users from altering the selected Attributes of the selected Entities until the lock is released. The lock information is stored in the Lock Data, which is depicted in FIG. 20.

The relationships between these tables are described below:

Locks lock Lock Entities. Each lock only applies to a specific set of Entities, as specified in the Lock Entities table 2010. This relationship identifies the Entities associated with a lock.

Locks lock Lock Attributes. Each lock only applies to a specific set of Attributes, as specified in the Lock Attributes table 2020. This relationship identifies the Attributes associated with a lock.

The data is locked by creating a lock and associating this lock with a set of Entities and Attributes. The locks table 2000 defines the currently active locks. Locks that are no longer active are deleted from this table.

Lock ID. Each lock is identified by a unique, numeric identifier, the Lock ID.

User ID. Each lock is created by the data maintenance activities of a specific user. The User ID identifies the user responsible for a lock. Only the user responsible for a lock or a system administrator can remove a lock.

Start Time. Each lock begins at a fixed time. The Start Time identifies when a lock began.

End Time. Each lock is scheduled to expire at a fixed time. The End Time identifies when a lock is scheduled to expire. Note that a lock is not automatically retired when the End Time passes; instead, this field is used to identify unintended locks so that a system administrator can manually remove these locks.

Each lock affects a specified collection of Entities and a specified selection of Attributes of those Entities. The Lock Entities table 2010 records the Entities that are affected by a lock.

Lock ID. The Lock ID identifies the lock that is applied to a specified Entity.

Entity Class ID. The Entity Class ID identifies the Entity class that is affected by a lock. If the Entity ID is 0, a lock applies to the entire Entity class. If the Entity ID is greater than 0, the Entity Class ID and Entity ID together form a global Entity identifier, which identifies an Entity affected by the lock.

Entity ID. The Entity ID 2013 identifies a specific Entity (within an Entity class) that is affected by a lock.

Each lock affects a specified collection of Attributes and a specified selection of Attributes of those Entities. The Lock Attributes table 2020 records the Attributes that are affected by a lock.

Lock ID. The Lock ID identifies the lock that is applied to a specified Attribute.

Attribute ID. The Attribute ID identifies the Attribute to which a lock applies.

In an alternative embodiment, the system and method may be integrated with a sea or shipping lane information system, or for an air traffic control lane information system. In other words, an anchor section may be representative of an air lane section or shipping lane section, and is not limited to a road section. Any real world model that lends itself to related linear data and spatial data may be implemented. It will be apparent to one skilled in the art that the Entities and Attributes of the above described Entity-Attribute data model may be modified to represent physical linear and spatial data and correlated with appropriate Attributes for the specific Entity. For instance, a shipping lane would have a geo-coordinate as does a road section, but instead of a pavement type Attribute it might have a water depth or water temperature Attribute. An air traffic lane might have an Attribute specifying minimum altitude or ground terrain.

Various preferred embodiments of the invention have been described in fulfillment of the various objects of the invention. It should be recognized that these embodiments are merely illustrative of the principles of the invention. Numerous modifications and adaptations thereof will be readily apparent to those skilled in the art without departing from the spirit and scope of the present invention.

What is claimed is:

1. A method for combining spatial and linear data in a single relational database, comprising:
   providing permanent anchor sections representing physical sections of a roadway, an anchor section defining a spatial reference in road data, the anchor sections also integrated with linear data to form a road network;
   associating attributes and linear events with positions in the road network;
   storing linear event data related to anchor sections in a relational table;
   storing road attribute data by associating each attribute with locations specified in terms of a linear referencing method (LRM);
   implementing a dynamic segmentation function for conducting dynamic segmentation on a selective basis;
   maintaining historical data related to anchor sections and linear event data;
   enabling the creation of an interior intersection within the road data, where an interior, intersection to an anchor section is defined by offsets from an end of the anchor section;
   synchronizing spatial and linear data, for tying spatial data to a physical location represented by the road network; and
   utilizing meta-data definitions for database elements in a data dictionary, the data dictionary defining an implementation of the relational database, resulting in an extensible relational database model.

2. A method as recited in claim 1, further comprising:
   dynamically segmenting permanent anchor sections by adding interior intersections using offset information.

3. A method as recited in claim 1, wherein the database model uses an open architecture.

4. A method as recited in claim 1, wherein linear event data is stored by storing each value anchored linear event combination in a separate table record.

5. A method as recited in claim wherein linear event data is stored by storing each value anchored linear event combination in a different table record with the same anchored linear events used for all event data, resulting in dynamic segmentation.

6. A method as recited in claim 1, wherein the linear event data comprises an event value; and an anchored linear event related to at least one anchor section, the anchored linear event identifying start and end offsets of an anchor section.

7. A method as recited in 6, wherein jurisdictional areas are maintained as spatial data, the method further comprising:
   storing jurisdictional area polygons in the database;
   accessing event data for a jurisdictional area using a spatial query;
   identifying anchor sections contained within a specified jurisdictional area; and
   compiling event data for the identified anchor sections using a relational query.

8. A method as recited in claim 7, further comprising:
   summarizing anchor section event data using a summary query.

9. A method as recited in claim 7, further comprising:
   summarizing anchor section event data using a report query.

10. A method as recited in claim 7, further comprising:
    pre-processing spatial queries for desired jurisdictional areas; and
    storing results of the pre-processed spatial queries for desired jurisdictional areas in a location accessible by a query program, resulting in more efficient access to event tables stored by the pre-processing queries.

11. A method as recited in claim 1, further comprising:
    importing road network data in the form of a link-node network by adding additional table columns required to maintain consistency of the link node network with a spatial data engine for the road network data, the adding further comprising:
    creating an entry in an anchor section table for each link in the imported road network link table;
    assigning an anchor section identifier (ID) to the entry;
    copying associated spatial data from the imported data into the spatial data engine road network data; and
    copying other data associated with the link to define the road network.

12. A method as recited in claim 1, further comprising:
    presenting data as tabular query results and reports.

13. A method as recited in claim 1, further comprising:
    using standard geographic information system (GIS) tools to produce maps using data in the road network.

14. A method as recited in claim 1, further comprising:
    locking data for a desired periods of time while new data is collected.

15. A method as recited in claim 1, further comprising:
    querying data in the road network by a combination of spatial and linear attributes.

16. A method as recited in claim 15, wherein the querying further comprises:
    using one of a spatial query based on a temporary area defined via a map interface or a relational query based on jurisdictional areas; and
    filtering results of the query based on event data associated with anchor sections in an area of interest as defined by the query.

17. A method as recited in claim 15, further comprising:
    summarizing event values for the associated anchor sections.

18. A method as recited in claim 15, further comprising:
    mapping the associated anchor sections.

19. A method as recited in claim 15, wherein the querying launches at least one distributed application to retrieve data from a distributed network of databases.

20. A method as recited in claim 15, further comprising:
    presenting results of the querying in a simple tabular display.

21. A method as recited in claim 1, further comprising:
    converting location reference data stored by a traditional linear referencing method to an anchor linear referencing method as a collection of anchor sections and intersections that represent the roadways, the converted data for use with the road network comprised of anchor sections integrated with linear data.

* * * * *

UNITED STATES PATENT AND TRADEMARK OFFICE
CERTIFICATE OF CORRECTION

PATENT NO. : 6,892,204 B2 Page 1 of 1
DATED : May 10, 2005
INVENTOR(S) : Haas et al.

It is certified that error appears in the above-identified patent and that said Letters Patent is hereby corrected as shown below:

<u>Column 145,</u>
Line 45, please change "A method as recited in claim wherein linear event data" to
-- A method as recited in claim 1, wherein linear event data --.

Signed and Sealed this

Twenty-second Day of November, 2005

JON W. DUDAS
*Director of the United States Patent and Trademark Office*